(12) United States Patent
Cohen et al.

(10) Patent No.: US 11,388,288 B2
(45) Date of Patent: *Jul. 12, 2022

(54) SYSTEMS AND METHODS FOR PARALLEL RECORDING OF EVENTS ON A SCREEN OF A COMPUTER

(71) Applicant: NICE LTD., Ra'anana (IL)

(72) Inventors: Yaron Cohen, Modiin (IL); Peri Fishgold, Tel Aviv (IL)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,854

(22) Filed: Aug. 30, 2020

(65) Prior Publication Data

US 2021/0051231 A1    Feb. 18, 2021

Related U.S. Application Data

(63) Continuation-in-part of application No. 16/180,053, filed on Nov. 5, 2018, now Pat. No. 10,880,434.

(51) Int. Cl.
| | |
|---|---|
| *H04M 3/523* | (2006.01) |
| *H04N 9/82* | (2006.01) |
| *H04N 21/433* | (2011.01) |
| *H04N 21/845* | (2011.01) |

(52) U.S. Cl.
CPC ........ *H04M 3/5232* (2013.01); *H04N 9/8205* (2013.01); *H04N 21/4334* (2013.01); *H04N 21/8456* (2013.01)

(58) Field of Classification Search
CPC ........... H04M 3/5175; H04M 3/42221; H04M 2201/50; H04M 2203/401; H04M 2203/559; H04M 3/5232; H04N 9/8205; H04N 21/4334; H04N 21/8456; H04L 67/02; H04L 67/06; G06F 11/3013; G06F 11/3438

See application file for complete search history.

(56) References Cited

U.S. PATENT DOCUMENTS

| | | |
|---|---|---|
| 2008/0181498 A1 | 7/2008 | Swenson |
| 2011/0083149 A1* | 4/2011 | Picucci ................ H04N 21/632 725/39 |
| 2014/0258405 A1 | 9/2014 | Perkin |

(Continued)

*Primary Examiner* — Benjamin M Thieu
(74) *Attorney, Agent, or Firm* — Pearl Cohen Zedek Latzer Baratz LLP

(57) ABSTRACT

Systems and methods for parallel recording of events on a screen receive start recording requests to start recording the events, each start recording request having an associated interaction identifier; capture the events on the screen in a series of video fragment files until a stop recording request with a corresponding associated interaction identifier has been received for each start recording request; update for each video fragment file, a metadata manifest with information about each interaction having events captured in the given video fragment file; and send the video fragment files, along with the updated metadata manifest to a server as each video fragment file is completed; wherein the video fragment files are forked to interaction files based on the updated metadata manifest, each interaction file associated with a different interaction; and wherein, upon receipt of a stop recording request, the files are merged into a single video recording file.

20 Claims, 23 Drawing Sheets

(56) References Cited

U.S. PATENT DOCUMENTS

| | | | |
|---|---|---|---|
| 2015/0067514 A1* | 3/2015 | Lewis | G06F 3/0482 715/720 |
| 2016/0117159 A1 | 4/2016 | Balko | |
| 2016/0294894 A1 | 10/2016 | Miller | |
| 2018/0330756 A1 | 11/2018 | MacDonald | |

* cited by examiner

| Timestamp | Component | Action(s) | | | |
|---|---|---|---|---|---|
| 10:00:00 | Recording Control Service | Sends start record request to the screen agent with the ID: "Int1" | | | |
| | Screen Agent | Has no other ongoing recordings → screen agent starts capturing the agent's monitor in 1-minute fragments. | | | |
| | | A recording mp4 file is created on the agent's local machine. Recording file name: F1 | | | |
| | | Update an inner mapping table <br><br> Interaction ID \| Start Time \| End Time <br> Int1 \| 10:00:00 \| - | | | |
| 10:01:00 | Screen Agent | F1 recording file is ready for upload and F2 recording file is created on the agent's local machine | | | |
| | | Mapping table contains only one interaction → uploading F1 directly to the Interaction target Int1 | | | |
| 10:01:30 | Recording Control Service | Sends start record request to the screen agent with the ID: "Int2" | | | |
| | Screen Agent | Has an ongoing recording (Int1) → screen capture is already working | | | |
| | | Update an inner mapping table <br><br> Interaction ID \| Start Time \| End Time <br> Int1 \| 10:00:00 \| - <br> Int2 \| 10:01:30 \| - | | | |
| 10:02:00 | Screen Agent | F2 recording file is ready for upload and F3 recording file is created on the agent's local machine. | | | |
| | | Mapping table contains more than one interaction → initiating smart plugin | | | |
| | | Uploading F2 and the manifest to the Agent target: | | | | 
| | | Filed | IntID | Start Time | End Time | End Tag |
| | | F2 | 1 | 10:01:30 | 10:02:00 | - |
| | | | 2 | 10:01:30 | 10:02:00 | |
| | Fork lambda | Copy F2 from the Agent target and fork it to Interactions target: <br> Interaction target associated with Int1 with the metadata: | | | |
| | | Start Time | End Time | End Tag | |
| | | 10:01:00 | 10:02:00 | - | |
| | | *Interaction* associated with Int2 with the metadata: | | | |
| | | Start Time | End Time | End Tag | |
| | | 10:01:30 | 10:02:00 | - | |

| 10:02:30 | Recording Control Service | Sends stop record request to the screen agent with the ID: "Int1" | | | |
|---|---|---|---|---|---|
| | Screen Agent | Update an inner mapping table | | | |
| | | Interaction ID | Start Time | End Time | |
| | | Int1 | 10:00:00 | 10:02:30 | |
| | | Int2 | 10:01:30 | - | |
| 10:03:00 | Screen Agent | F3 recording file is ready for upload and F4 recording file is created on the agent's local machine. | | | |
| | | Mapping table contains more than one interaction → continue to use smart plugin | | | |
| | | Uploading F3 to *Agent target* with the manifest: | | | |
| | | Filed | IntID | Start Time | End Time | End Tag |
| | | F3 | 1 | 10:02:00 | 10:02:30 | √ |
| | | | 2 | 10:02:00 | 10:0:00 | - |
| | | Update an inner mapping table: | | | |
| | | Interaction ID | Start Time | End Time | |
| | | Int2 | 10:01:30 | - | |
| | Fork lambda | Copy F3 from the Agent target and fork it to Interactions target: | | | |
| | | Interaction target associated with Int1 with the metadata: | | | |
| | | Start Time | End Time | End Tag | |
| | | 10:02:00 | 10:02:30 | √ | |
| | | Interaction target associated with Int2 with the metadata: | | | |
| | | Start Time | End Time | End Tag | |
| | | 10:02:00 | 10:03:00 | - | |
| | Mega lambda | Collecting all recording fragments from the Interaction target associated with Int1: | | | |
| | | Start Time | End Time | | |
| | | 10:00:00 | 10:01:00 | | |
| | | 10:01:00 | 10:02:00 | | |
| | | 10:02:00 | 10:02:30 | | |
| | | Merge all into single mp4 file using the metadata | | | |

| 10:03:30 | Recording control service | Send stop record request to the screen agent with the id: "Int2" |
| --- | --- | --- |
| | Screen agent | Update an inner mapping table: <table><tr><th>Interaction ID</th><th>Start Time</th><th>End Time</th></tr><tr><td>Int2</td><td>10:01:30</td><td>-</td></tr></table> Has no other ongoing recordings → screen agent stops capturing the agent's monitor <br> Mapping table contains only one interaction → uploading F4 directly to the Interaction target associated with Int2 with end tag |
| | Mega lambda | Collecting all recording fragments from the Interaction target associated with Int2: <table><tr><th>Start Time</th><th>End Time</th></tr><tr><td>10:01:30</td><td>10:02:00</td></tr><tr><td>10:02:00</td><td>10:03:00</td></tr><tr><td>10:01:30</td><td>10:03:30</td></tr></table> Merge all into single mp4 file using the metadata |

FIG. 24C

SYSTEMS AND METHODS FOR PARALLEL RECORDING OF EVENTS ON A SCREEN OF A COMPUTER

CROSS-REFERENCE TO RELATED APPLICATION

This application is a continuation-in-part of U.S. application Ser. No. 16/180,053, filed Nov. 5, 2018.

FIELD OF THE INVENTION

The present invention relates to video recording, and more specifically to a method and system for parallel recording of events on a screen of a computer.

BACKGROUND OF THE INVENTION

A company may use customer call centers to provide customer service for their products and/or services. The customer experience in interacting with agents at the customer service center may depend, for example, on the efficiency of the agent to solve the customer's problem in a single interaction between the agent and the customer.

To track an agent's efficiency in handling the customer's call and solving the customer's problem, the company may monitor and/or record customer calls of the agents for quality control. The desktop or workstation of each agent may include multiple monitors, displays, or screens. The screens may be used to provide different information to the agent simultaneously in real time, such as for example, information regarding the customer, the product and/or services in question, and/or any other information needed by the agent to solve the customer's problem regarding the company's product and/or services.

Quality control personnel and/or the agent's managers, for example, may monitor the agent's customer calls for assessing agent performance and/or agent efficiency by accessing a video recording made of events on screen of the agent's terminal or desktop during a customer call, for example. Typically, the information presented and/or accessed by the agent on the screen during each customer call may be recorded into a single video recording along with the audio and/or video portion of the conversation between the customer and the customer service agent.

In that quality control personnel and/or the agent's supervisors may be at different geographical locations, cloud computing services may be used to relay the agent's screen events to the quality control personnel and/or the agent's supervisors at the remote location to be recorded in real time. This may induce large time delays between the time that the supervisor sends a request to the agent's terminal to relay the screen events and the time that the supervisor actually views the streaming video of the screen events on the agent's terminal in real time, which may be recorded on the supervisor's workstation, for example.

Current solutions to provide real-time streaming overcome a wide variety of firewalls and Network Address Translation (NAT)/Port Address Translation (PAT) restrictions/configurational issues. These solutions implement complicated signaling schemes such as web sockets, Web Real-Time Communication (WebRTC), Session Traversal Utilities for NAT (STUN), and Traversal Using Relay NAT (TURN) to overcome NAT restrictions.

Furthermore in using these current solutions, real time session establishment of the communication between the agent and supervisor terminal, for example, has a large time overhead or delay time (e.g., 3-4 sec), which may result in a loss of the video at the beginning of the agent's call. These real time solutions may be also sensitive to network stability such as temporary network outages/disconnections and/or bandwidth for insuring video quality. A bad user experience may occur with seek operations due to sizing issues (fixed 3000 frames) of a group of pictures, or GOP structure, which specifies the order in which intra- and inter-video frames are arranged.

Thus, there may be a need for a real time, cloud-based video recording of events on agent's desktop screens that overcome these limitations of real-time streaming solutions.

Additionally, agents are often required to engage in multiple sessions (e.g., with multiple customers) concurrently over various channels. Since the agent in a digital contact center is likely be handling multiple digital interactions simultaneously, there is a challenge to be able to provide a high quality screen recording playback for each digital interaction separately that may overlap with an unknown number of ongoing sessions while abiding various requirements and design principles including, for example: (1) Multiple sessions—No session count limit; (2) Minimal footprint (e.g., on the agent's desktop)—CPU, Memory & Network throughput; (3) Simplicity—less system flows, less race conditions, less assumptions, etc. (3) Cost effective—cloud resources (e.g., AWS), development effort & low maintenance (simplicity); (4) Minimal risk—for the existing solution (simplicity); (5) Video Quality—High video quality and fast playback response time; and (6) Recording decoupling—PCI/GDPR, media retention, etc.

Thus, there may be a need for a real time, cloud-based video recording of concurrent or parallel events on agent's desktop screens that overcome these limitations of prior art recording systems.

SUMMARY OF THE INVENTION

There is thus provided, in accordance with some embodiments of the present invention, a computerized method for parallel recording of events on a screen of a computer. The method may include, in a processor of a computer configured to execute code for recording events on a screen of the computer, receiving a start recording request to record the screen events from a server communicating with the computer over a communication network. The events on the screen may be captured. The captured screen events may be stored in a storage of the computer into a plurality of video fragment files in a queue in the storage using video fragment settings. The plurality of video fragment files in the queue may be sent over the communication network to the server. The video fragment settings may be dynamically changed upon detecting a backlog in the queue of the plurality of video fragment files in the storage. In response to receiving a stop recording request from the server, a notification may be sent to the server that all of the plurality of video fragment files in the queue were relayed to the server over the communication network for the server to merge the plurality of video fragment files into a single video recording file.

Furthermore, in accordance with some embodiments of the present invention, sending the plurality of video fragments may include uploading the plurality of video fragment files to a distributed cloud storage.

Furthermore, in accordance with some embodiments of the present invention, detecting the backlog in the queue may include detecting that a number of the plurality of video fragment files exceeds a predefined number.

Furthermore, in accordance with some embodiments of the present invention, dynamically changing the video fragment settings may include changing a group of pictures (GOP) size in the plurality of video fragment files for managing the backlog.

Furthermore, in accordance with some embodiments of the present invention, dynamically changing the video fragment settings may include changing a frame rate of the plurality of video fragment files for managing the backlog.

Furthermore, in accordance with some embodiments of the present invention, dynamically changing the video fragment settings may include changing a frame duration of the plurality of video fragment files for managing the backlog.

Furthermore, in accordance with some embodiments of the present invention, the captured screen events may be selected from the group consisting of: audio signals captured by an input device, audio signals captured through an output device, videos captured on the screen, and images captured on the screen.

Furthermore, in accordance with some embodiments of the present invention, the communication network may use a Hypertext Transfer Protocol Secure (HTTPS) protocol for sending the plurality of video fragment files to the server.

There is further provided, in accordance with some embodiments of the present invention, a client computer for creating a fragmented recording of events on a screen of the computer. The client computer may include a storage, a screen, and a processor. The processor may be configured to execute code for recording events on the screen, to receive a start recording request to record the screen events from a server communicating with the computer over a communication network, to capturing the events on the screen, to store the captured screen events into a plurality of video fragment files in a queue in the storage using video fragment settings, to send the plurality of video fragment files in the queue over the communication network to the server, to dynamically change the video fragment settings upon detecting a backlog in the queue of the plurality of video fragment files in the storage, and in response to receiving a stop recording request from the server, to send a notification to the server that all of the plurality of video fragment files in the queue were relayed to the server over the communication network for the server to merge the plurality of video fragment files into a single video recording file.

Furthermore, in accordance with some embodiments of the present invention, the storage may include a local disk on the client computer.

Furthermore, in accordance with some embodiments of the present invention, the code for recording the events on the screen may include a screen agent client software.

Furthermore, in accordance with some embodiments of the present invention, the plurality of video fragment files may include a plurality of standard containers.

Furthermore, in accordance with some embodiments of the present invention, the processor may be configured to detect the backlog in the queue by detecting that a number of the plurality of video fragment files exceeds a predefined number.

Furthermore, in accordance with some embodiments of the present invention, the processor may be configured to dynamically change the video fragment settings by changing a group of pictures (GOP) size in the plurality of video fragment files for managing the backlog.

Furthermore, in accordance with some embodiments of the present invention, the processor may be configured to dynamically change the video fragment settings by changing a frame rate of the plurality of video fragment files for managing the backlog.

Furthermore, in accordance with some embodiments of the present invention, the processor may be configured to dynamically change the video fragment settings by changing a frame duration of the plurality of video fragment files for managing the backlog.

Furthermore, in accordance with some embodiments of the present invention, the captured screen events may be selected from the group consisting of: audio signals captured by an input device, audio signals captured through an output device, videos captured on the screen, and images captured on the screen.

Furthermore, in accordance with some embodiments of the present invention, the communication network may use a Hypertext Transfer Protocol Secure (HTTPS) protocol to send the plurality of video fragment files to the server.

There is further provided, in accordance with some embodiments of the present invention, a computerized method for managing a fragmented recording of events on a screen of a client computer in a computerized system by a server. The method may include in a processor of a server communicating with a client computer over a communication network, sending by the processor to the client computer a start recording request to record events on a screen of the client computer. A plurality of video fragment files may be received by the processor for storage in a location of a storage in the server, where each of the video fragment files include screen events captured on the screen of the client computer. A stop recording request may be sent by the processor to the client computer. A notification may be receive by the processor that all of the plurality of video fragment files were relayed from the client computer over the communication network.

In response to the received notification, the plurality of video fragment files may be merged by the processor into a single video recording file.

Furthermore, in accordance with some embodiments of the present invention, the processor may execute a serverless computing service for managing the plurality of video fragment files to create the single video recording file.

There is further provided, in accordance with some embodiments of the present invention, a computerized method for parallel recording of events on a screen of a computer, performed in a processor of the computer configured to execute code for recording the events on the screen of the computer. In some embodiments, the method may include receiving by the processor, from a server communicating with the computer over a communication network, a plurality of start recording requests to start recording the events on the screen, in which each start recording request has an associated interaction identifier identifying an interaction of a plurality of interactions; capturing by the processor, the events on the screen in a series of one or more video fragment files until a stop recording request with a corresponding associated interaction identifier has been received from the server for each of the plurality of start recording requests; updating by the processor, for each video fragment file, a metadata manifest with information about each interaction having events captured in the given video fragment file; and sending by the processor, each of the one or more video fragment files, along with the updated metadata manifest, over the communication network to the server as each video fragment file is completed; in which each video fragment file is forked to one or more interaction files on the server based on the updated metadata manifest, each interaction file being associated with a different interaction; and in which, upon receipt by the processor of a stop recording request for the given interaction, the video fragment files in the associated video interaction file are merged into a single video recording file.

Embodiments of method may include storing each merged video recording file in a storage on the server. In some embodiments of the method, each of the one or more video fragment files comprises a predetermined length of video. In some embodiments of the method, the information in a given updated metadata manifest comprises an interaction identifier, an start time and an end time for each interaction having events captured in the given video fragment file with which the given updated metadata manifest was sent. In some embodiments of the method, the series of one or more video fragment files are captured consecutively. In some embodiments of the method, one or more of the plurality of start recording requests to start recording the events on the screen are received at least one of synchronously and asynchronously. In some embodiments of the method, one or more of the plurality of stop recording requests to stop recording the events on the screen are received at least one of synchronously and asynchronously.

Further embodiments of the invention provide a system for parallel recording of events on a screen of a computer. The system may include a computer having a processor and memory, and one or more code sets stored in the memory and executed by the processor. In some embodiments, the code sets configure the processor to: receive from a server communicating with the computer over a communication network, a plurality of start recording requests to start recording the events on the screen, wherein each start recording request has an associated interaction identifier identifying an interaction of a plurality of interactions; capture the events on the screen in a series of one or more video fragment files until a stop recording request with a corresponding associated interaction identifier has been received from the server for each of the plurality of start recording requests; update for each video fragment file, a metadata manifest with information about each interaction having events captured in the given video fragment file; and send each of the one or more video fragment files, along with the updated metadata manifest, over the communication network to the server as each video fragment file is completed; in which each video fragment file is forked to one or more interaction files on the server based on the updated metadata manifest, each interaction file being associated with a different interaction; and in which, upon receipt by the processor of a stop recording request for the given interaction, the video fragment files in the associated video interaction file are merged into a single video recording file.

In some embodiments of the system, the processor is configured to store each merged video recording file in a storage on the server. In some embodiments of the system, each of the one or more video fragment files comprises a predetermined length of video. In some embodiments of the system, the information in a given updated metadata manifest comprises an interaction identifier, an start time and an end time for each interaction having events captured in the given video fragment file with which the given updated metadata manifest was sent. In some embodiments of the system, the series of one or more video fragment files are captured consecutively. In some embodiments of the system, one or more of the plurality of start recording requests to start recording the events on the screen are received at least one of synchronously and asynchronously. In some embodiments of the system, one or more of the plurality of stop recording requests to stop recording the events on the screen are received at least one of synchronously and asynchronously.

Further embodiments of the invention provide a method for parallel recording of events on a screen of a computer, performed on a server in communication over a communication network with a processor of the computer, the processor configured to execute code for recording the events on the screen of the computer, the method including: sending from the server to the processor over the communication network, a plurality of start recording requests to start recording the events on the screen, wherein each start recording request has an associated interaction identifier identifying an interaction of a plurality of interactions; in which the processor is configured to capture the events on the screen in a series of one or more video fragment files until a stop recording request with a corresponding associated interaction identifier has been received from the server for each of the plurality of start recording requests; and in which the processor is configured to update, for each video fragment file, a metadata manifest with information about each interaction having events captured in the given video fragment file; receiving, by the server, each of the one or more video fragment files, along with the updated metadata manifest, over the communication network from the processor as each video fragment file is completed; forking, by the server, each video fragment file to one or more interaction files on the server based on the updated metadata manifest, each interaction file being associated with a different interaction; and upon receipt by the processor of a stop recording request for the given interaction, merging by the server the video fragment files in the associated video interaction file into a single video recording file.

Some embodiments of the method include storing each merged video recording file in a storage on the server. In some embodiments of the method, each of the one or more video fragment files comprises a predetermined length of video. In some embodiments of the method, the information in a given updated metadata manifest comprises an interaction identifier, an start time and an end time for each interaction having events captured in the given video fragment file with which the given updated metadata manifest was sent. In some embodiments of the method, the series of one or more video fragment files are captured consecutively. In some embodiments of the method, one or more of the plurality of start recording requests to start recording the events on the screen are sent at least one of synchronously and asynchronously; and one or more of the plurality of stop recording requests to stop recording the events on the screen are received at least one of synchronously and asynchronously.

These and other aspects, features and advantages will be understood with reference to the following description of certain embodiments of the invention.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 24A shows a detailed explanation of the recording timeline of FIG. 23, in accordance with some embodiments of the present invention;

FIG. 24B shows a detailed explanation of the recording timeline of FIG. 23, continuing from FIG. 24A, in accordance with some embodiments of the present invention; and FIG. 24C shows a detailed explanation of the recording timeline of FIG. 23, continuing from FIG. 24B, in accordance with some embodiment of the present invention.

DETAILED DESCRIPTION OF THE INVENTION

Figure 1:
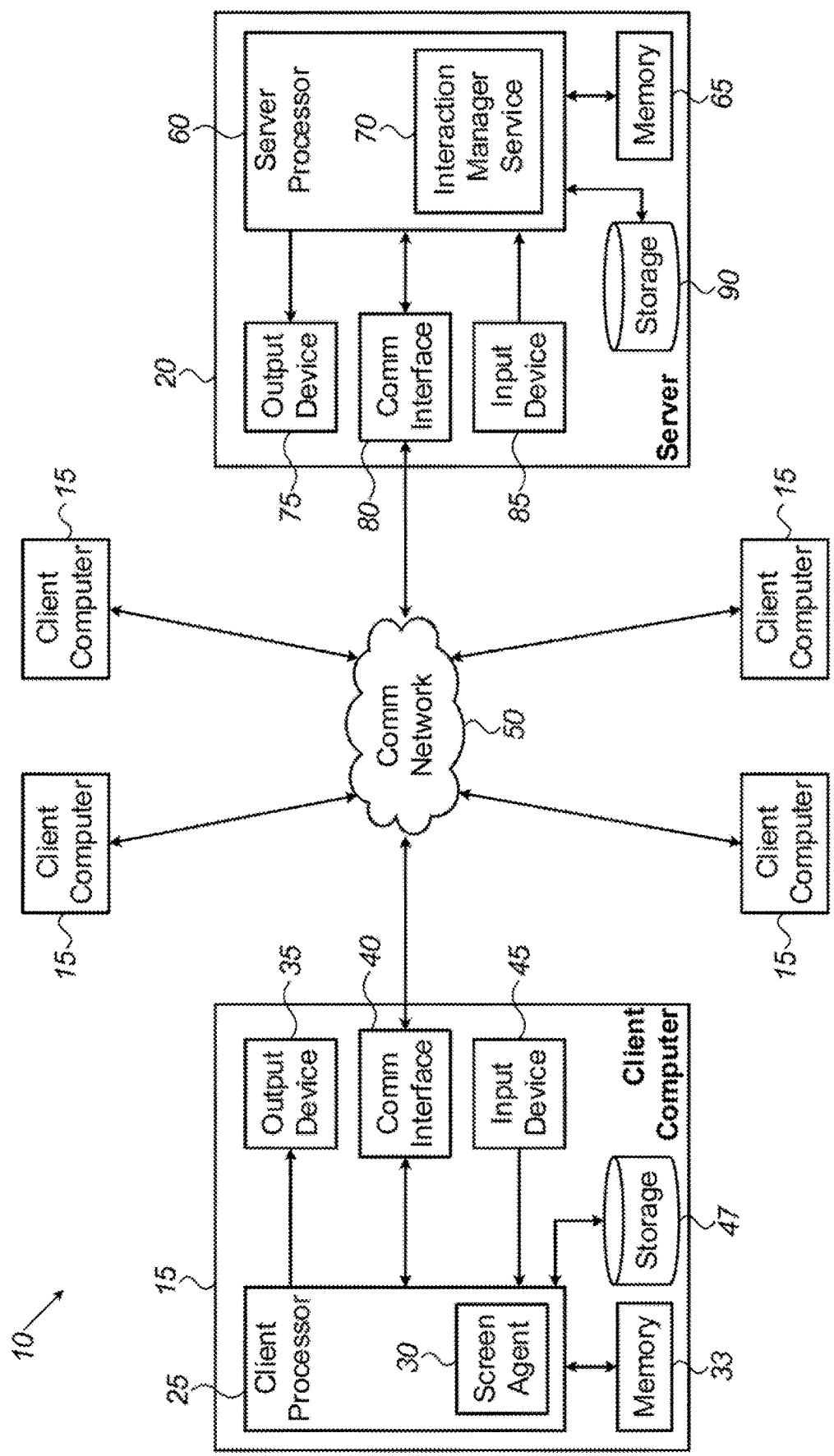
FIG. 1 schematically illustrates a block diagram of a system for creating a fragmented video recording of a screen and for parallel recording of events on a screen of a computer using a cloud-based serverless architecture, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention herein provide a method and system for creating a fragmented video recording of events on a screen of a client computer of a call center agent, for example, in a customer call center. A supervisor or quality control personnel at a remote location may send a request via a communication network to the client computer to start recording events on the computer screen. A screen agent application operating on the agent's client computer may start to capture screen events on the client computer.

In the context of the present disclosure, the term "screen events" may refer to audio signals captured by an input device at the agent's terminal, such as the agent's voice captured with a microphone, audio signals captured by an output device, such as the customer voice heard by the agent in a headphone or external speaker while interacting with the agent, videos on the screen that the agent is viewing, and/or still images on the screen that the agent is viewing. The agent may be interacting with another person, such as a customer, via a regular phone call and/or video call agents and/or applications operating on the agent's computer (e.g., client computer). These captured interactions may also be screen events in the context of the present disclosure.

In some embodiments of the present invention, the client computer may be configured to record the captured screen events to small media files, which also may be referred to herein as video fragment files. The client computer may use and/or apply video fragment settings such as a group of pictures (GOP) size, a frame rate, and a frame duration when creating video fragment files from the captured screen events. The video fragment files may be stored in a storage device such as the local disk on the computer. The video fragment files may be queued in the storage device. Each video fragment file in the queue may relayed or uploaded independently over the communication network, typically using a Hypertext Transfer Protocol Secure (HTTPS) protocol, to a location in a server storage device on the server (e.g., distributed cloud storage).

In response to a request sent to the client computer to stop recording the screen events on the client computer, the client computer may send a notification to the server that all of the plurality of video fragment files in the queue were relayed to the server over the communication network. The server may merge the video fragment files into a single video recording file on the server and subsequently stored on the server for playback.

In some embodiments of the present invention, the server may use a serverless computing service, such as Amazon Web Services (AWS) Lambda, for example, for managing the received video fragment files and merging them into a single recording file. Serverless computing may include a cloud-computing execution model in which the cloud provider may dynamically manage the allocation of machine resources. AWS Lambda services, for example, may allow a customer to run code without provisioning or managing servers. The customer may pay only for the computing time.

In some embodiments of the present invention, if the client computer detects a backlog in the queue of video fragment files to be sent to the server over the communication network, for example, to due to network latency or other impairments, smart algorithms may be used to dynamically change the video fragment file settings to reduce the backlog in the queue.

Thus, the embodiments taught herein overcome the technical problems seen in NAT and WebRTC based real time streaming solutions where the captured screen events on the client computer are streamed over the communication network to the server and the recording is created on the server side. In contrast to the embodiments taught herein, all recordings are created on the client computer as video fragment files in response to a start recording request. Each of the video fragment files may be individually uploaded to the server. The server may be used to merge the video fragment files to a single recording file. Thus, there is no loss of the beginning of the recording due to network latency. The video may exhibit higher video quality from start to finish with a smooth playback seek as well as faster forward and backward effects.

Furthermore, the embodiments taught herein provide a distributed recording solution where a network disconnection, for example, may have little or no effect. In that storage and/or merging of the video fragment files on the server may use a cloud serverless computing architecture, the overall recording solution may be more cost effective.

Furthermore, embodiments of the invention provide systems and methods for screen recording an unlimited number of digital interactions which are handled by the same agent desktop while having a single recording footprint (e.g., CPU, Memory, and Network throughput) together without reducing the recording video quality.

FIG. 1 schematically illustrates a block diagram of a system 10 for creating a fragmented video recording of a screen using a cloud-based serverless architecture, in accordance with some embodiments of the present invention. System 10 may include one or more client computers 15 (e.g., at least one client computer) communicating with a server 20 via a communication network 50. Each client computer 15 may include a processor 25 coupled to a memory 33, a storage device 47, an input device 45, an output device 35, and communication interface circuitry 40 for communicating with communication network 50. Similarly, server 20 may include a server processor 60 coupled to a memory 65, a storage device 90, an input device 85, an output device 75, and a communication interface circuitry 80 for communicating with communication network 50.

Although many of the figures shown hereinbelow may relate to a recording of screen events into a plurality of video fragment files on one client computer that are relayed to server 20 for merging into a single video recording file, for example, this is not by way of limitation of the embodiments taught herein. Any number of users using any respective number of the one or more client computers 15 as shown in FIG. 1 may have screen events recorded to video fragment files. The video fragment files from each client computer may be relayed to server 20 for merging into a respective recording file for playback by a supervisor or manager, for example. Thus, an interaction manager service 70 operating on processor 60 on server 20 may be used to manage the recording of screen events of multiple client computers 15 (e.g., on multiple agent desktops) and to merge the video fragment files from each of the client computers into a single recording file.

Client processor 25 and server processor 60 may include one or more processing units, e.g. of one or more computers. Processors 25 and 60 may be configured to operate in accordance with programmed instructions stored in memories 33 and 65 and/or storage devices 47 and 90. Client processor 25 may be capable of executing a screen agent application 30 for recording events at the computer terminal, screen and/or display of a customer agent desktop computer terminal at a customer call center. Similarly, server processor 60 may be capable of executing interaction manager service 70 for managing and merging the video fragment files received over communication network from each of client computers 15 as well as implementing the serverless computing services for implementing these functions.

Client processor 25 may communicate with output device 35. For example, output device 35 may include a computer monitor or screen on which screen agent 30 may capture the screen events and record them into a plurality of video fragment files. Output device 35 may include a printer, display panel, speaker, or another device capable of producing visible, audible, or tactile output.

Similarly, server processor 60 may communicate with a screen of output device 75 to display an graphic user interfaces for interaction manager service 70 for the user (e.g., manager or quality control users) of the system 10 to manage the recording of the screen events on each of the one or more client computers 15. Output device 75 may include a printer, display panel, speaker, or another device capable of producing visible, audible, or tactile output.

Processor 25 may communicate with input device 45. For example, input device 45 may include one or more of a keyboard, keypad, or pointing device for enabling a user to inputting data or instructions for operation of processor 25, which may be captured as screen events. Input device 45 may also include a microphone capturing the audio signals of a voice of the client computer user (e.g., an agent's voice during a customer call), which may be also included in the captured screen events.

Similarly, server processor 60 may communicate with server input device 85. For example, server input device 85 may include one or more of a keyboard, keypad, or pointing device for enabling a user of system 10 (e.g., supervisor or quality control managers) for inputting data or instructions for operation of processor 60 (e.g., via interaction service manager 70).

Processors 25 and 60 may communicate with respectively with memories 33 and 65. Memories 33 and 65 may each include one or more volatile or nonvolatile memory devices. Memories 33 and 65 may be utilized to store, for example, programmed instructions for operation of processors 25 and 60, respectively, data or parameters for use by processors 25 and 60 during operation, or results of operations of processors 25 and 60.

Processors 25 and 60 may communicate with respectively with data storage devices 47 and 90. Data storage devices 47 and 90 may each include one or more fixed or removable nonvolatile data storage devices such as a local disk. For example, data storage devices 47 and 90 may include a computer readable medium for storing program instructions for operation of processors 25 and 60, respectively. It is noted that data storage devices 47 and 90 may be remote from their respective processors 25 and 60. Data storage devices 47 and 90 may be utilized to store data or parameters for use by respective processors 25 and 60 during operation, or results of operation of processors 25 and 60, respectively.

In operation, processors 25 and 60 may execute a method for creating a fragmented video recording of screen events on one or more client computer 15 using a cloud serverless architecture implemented on server 20. Processor 25 may implement screen agent 30 to manage the creation of video fragment files in accordance with the video fragment settings as well as to upload them to server 20 (e.g., a cloud server) over communication network 50. Processor 60 may execute serverless computing processes such as AWS lambda for receiving the video fragment files over communication network 50, for storing them in a location in storage 90, and for merging them into a single recording file for use by a user of system 20 (e.g., a supervisor).

The following FIGS. 2-11 hereinbelow are flow diagrams for illustrating each step in a method for creating a fragmented video recording of screen events on client computer 15 (e.g., on the client computer side), which may relayed to server 20. Server 20 may implement a cloud serverless architecture, (e.g., AWS Lambda) for managing the received video fragment files and merging them into a single recording file on the server side.

Figure 2:
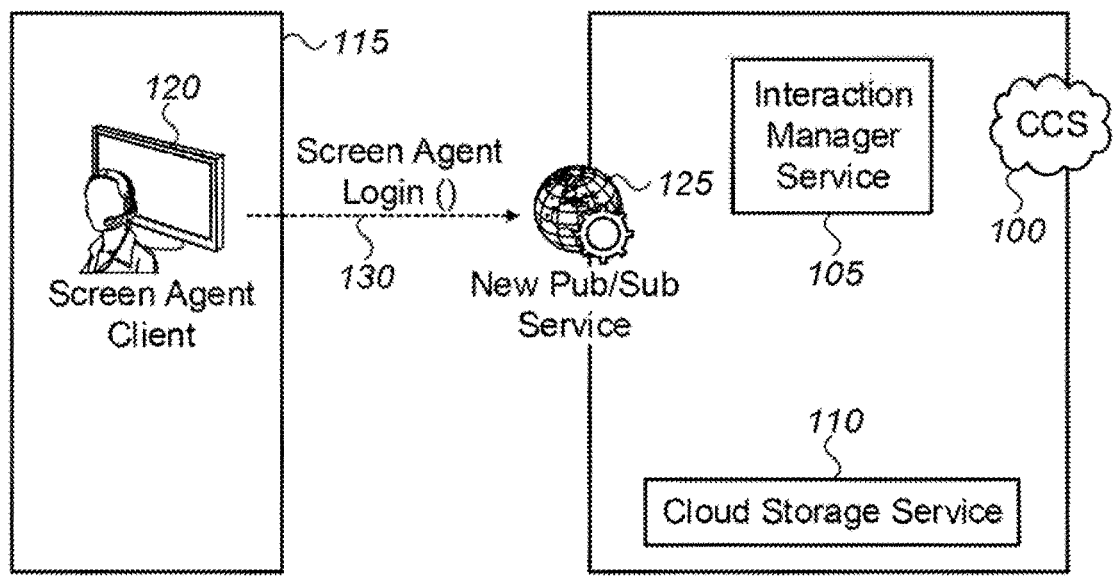
FIG. 2 schematically illustrates a screen agent registration to a cloud computing service (CCS), in accordance with some embodiments of the present invention.

FIG. 2 schematically illustrates a screen agent registration 95 to a cloud computing service (CCS) 100, in accordance with some embodiments of the present invention. CCS 100, such as Amazon Web Services (AWS), may include interaction manager service 105 and a cloud storage service 110, such as Amazon Web Services/S3, for example, executed by server processor 60.

An agent at client computer 15 executing a screen agent client 120 (e.g., screen agent 30 on client computer 15 in FIG. 1) in a call center 115 (e.g., on premise customer) may log 130 into CCS 100, which initiates a new publication or subscription service 125 specific to screen agent 120. Subscription service 125 may be a cloud signaling service using Websocket, HTTP Streaming, or HTTP long pooling. Through this channel signaling (e.g., signaling services 155 shown in FIG. 3 below), screen agent client 120 may receive control commands such as StartRecord, StopRecord commands, for example. This signaling channel may use communication network 15 (e.g., used for uploading video fragment files using HTTPS) or any another suitable communication network separate from communication network 15. The agent may initiate a call with a customer.

Figure 3:
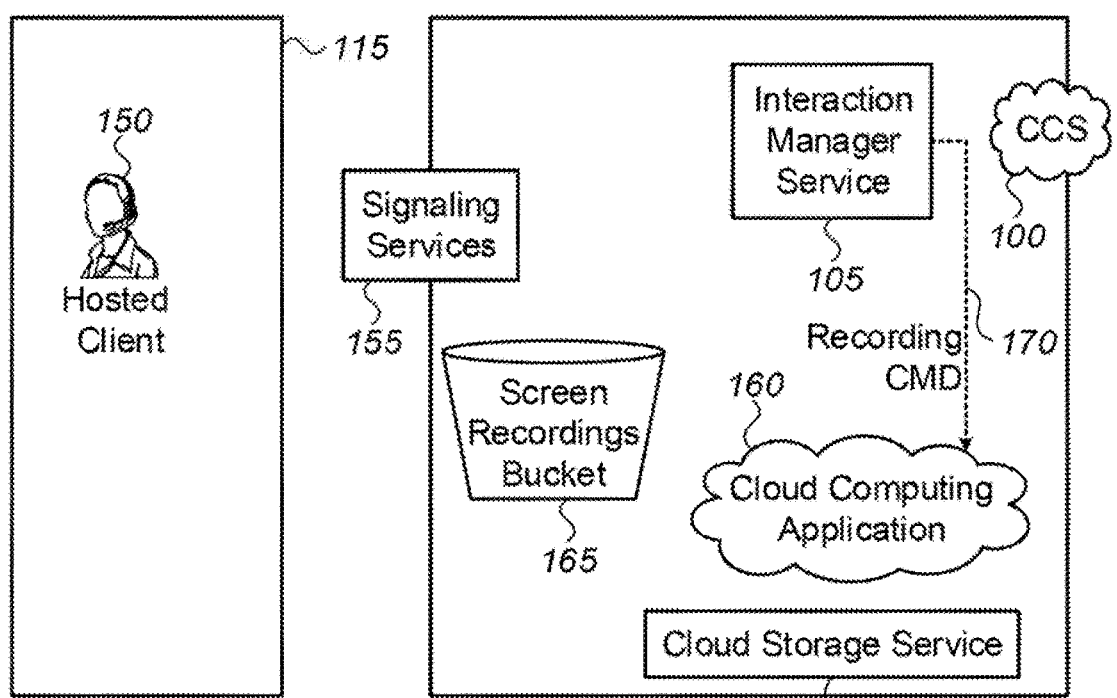
FIG. 3 schematically illustrates a flow diagram to start recording screen events on a hosted client, in accordance with some embodiments of the present invention.

FIG. 3 schematically illustrates a flow diagram 140 to start recording screen events on a hosted client 150, in accordance with some embodiments of the present invention. When the agent initiates a call with a customer and registers with new publication or subscription service 125 as shown in FIG. 2, interaction manager service 105 may decide to issue a recording command 170. The decision to issue recording command 170 may be based on a supervisor or Quality Management staff manually entering the command, or automatically in accordance with some predefined criteria monitored by interaction manager service 105. Recording command 170 may relayed to a cloud computing application service 160. In response, a new cloud computing application service 160, such as AWS Lambda, may be established to provide a serverless Screen Recorder Service to manage the video fragment files specifically for hosted client 150 that logged in.

Figure 4:
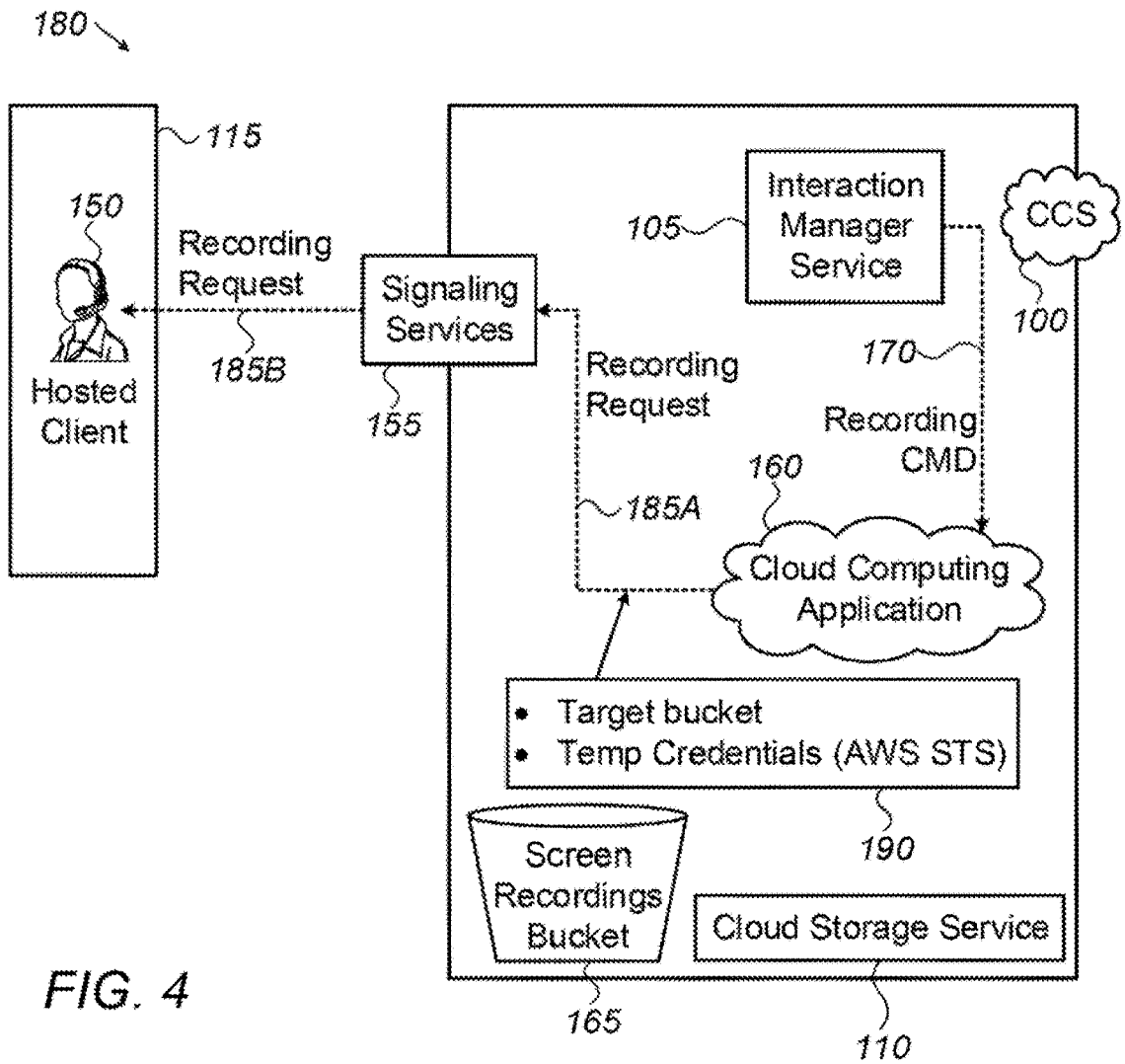
FIG. 4 schematically illustrates a flow diagram to relay a recording request to a hosted client using signaling services, in accordance with some embodiments of the present invention.

FIG. 4 schematically illustrates a flow diagram 180 to relay a recording request 185 to hosted client 150 using signaling services 155, in accordance with some embodiments of the present invention. Cloud computing application service 160 (e.g., serverless Screen Recorder Service) may relay a recording request 185A in response to recording command 170 to signaling services 155, which may subsequently relay recording request 185B to hosted client 150. In some embodiments, signaling services 155 may be implemented by a signal server (not shown), which is a network component that sets up a signaling gateway for transferring signal messages.

In some embodiments of the present invention, recording request 185 may include a tenant ID, a target bucket name, Security Token Service (STS) keys, a recording ID, and a request type.

In some embodiments of the present invention, the recording command 185 may include as shown in a parameter block 190: a target upload location, such as a location of screen recording buckets 165 and temporary credentials (AWS STS) to allow a PUT request. With these recording command parameters, screen agent 30 may upload the captured screen data in the recorded video fragment files to a Distributed Cloud Storage (e.g., cloud storage service 110).

Figure 5:
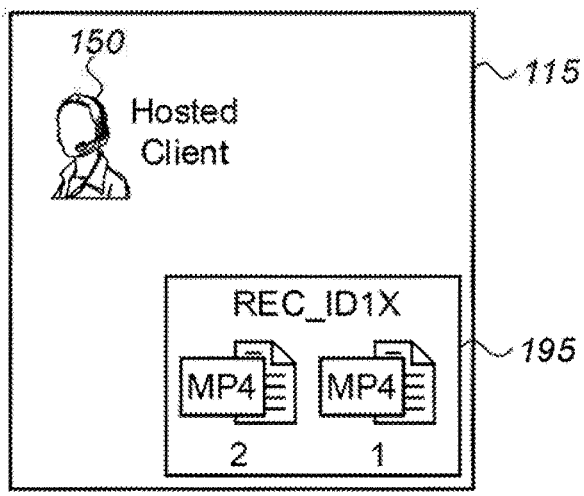
FIG. 5 schematically illustrates video fragment files in a queue, in accordance with some embodiments of the present invention.

FIG. 5 schematically illustrates video fragment files in a queue 195, in accordance with some embodiments of the present invention. In response to screen agent 30 receiving recording request 185, screen agent 30 of hosted client 150 may capture screen events or activity. The captured screen events may be stored a standard container such as MP4, or WebM, for example, to form video fragment files denoted individually as 1 and 2 (e.g., Container 1 and Container 2) in queue 195 in FIG. 5. The captured screen events may be stored in containers at predefined intervals such as every X seconds, for example, where X is any number. After X seconds, screen agent 30 may finalize the container file and start to create a new container file. X may or may not be the same for all video fragment files and may be varied dynamically with changes in the video fragment settings.

Figure 6:
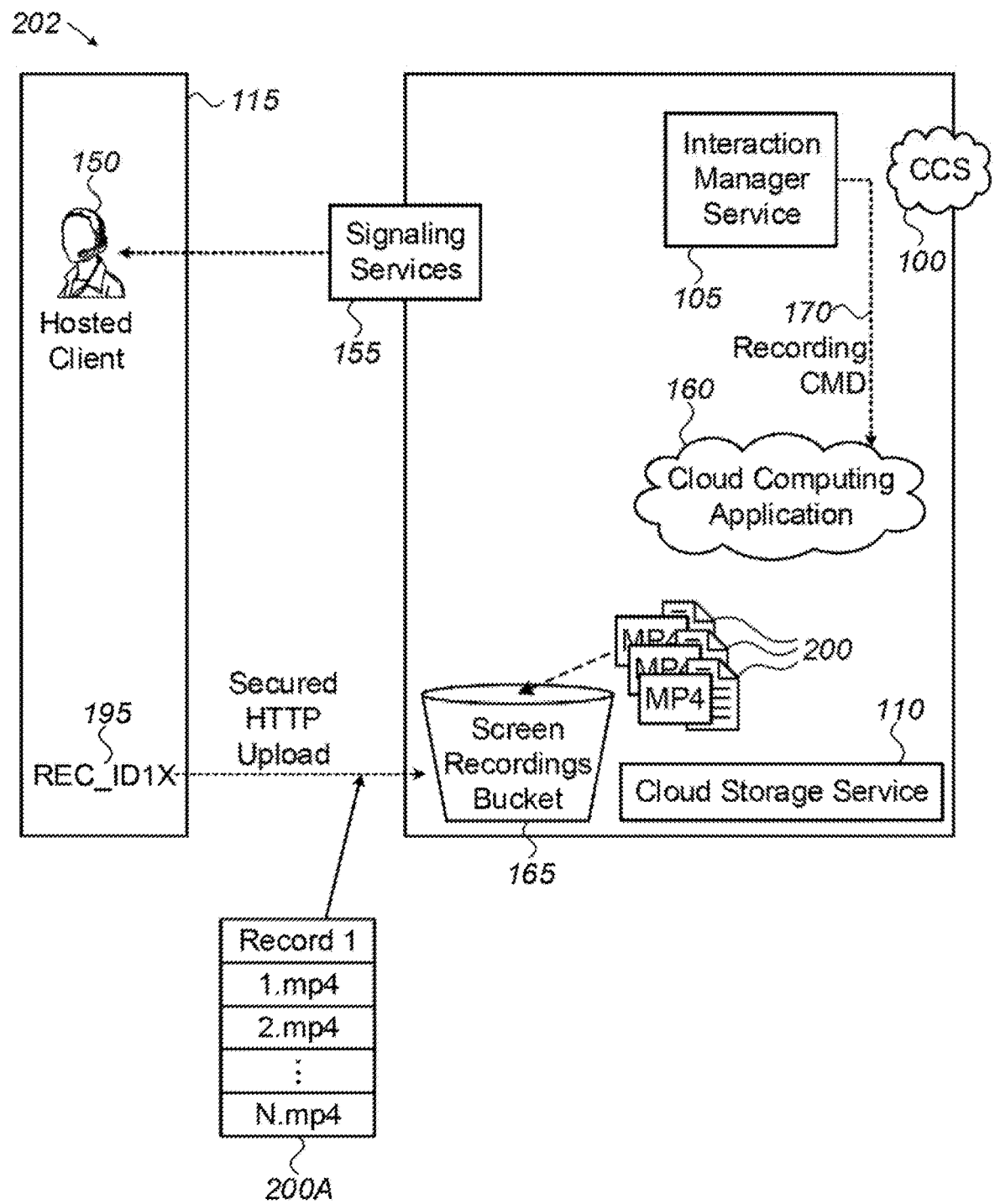
FIG. 6 schematically illustrates a flow diagram for uploading video fragment files in a queue to a screen recording bucket, in accordance with some embodiments of the present invention.

FIG. 6 schematically illustrates a flow diagram 202 for uploading video fragment files in queue 195 to screen recording bucket 165, in accordance with some embodiments of the present invention. As the video fragment files are formed, the video fragment files denoted 1.mp4, 2.mp4 . . . N.mp4 are uploaded 200A from queue 195 over communication network 50 using an HTTPS protocol to screen recording bucket 165 (e.g., the target upload location in distributed cloud storage). The uploaded video fragment files in screen recording bucket 165 are shown in FIG. 6 as MP4 files 200. Also shown in FIG. 6, queue 195 is empty. In some embodiments, each of the uploaded files may include a tenant ID, a recording ID, and an MP4 file.

Figure 7:
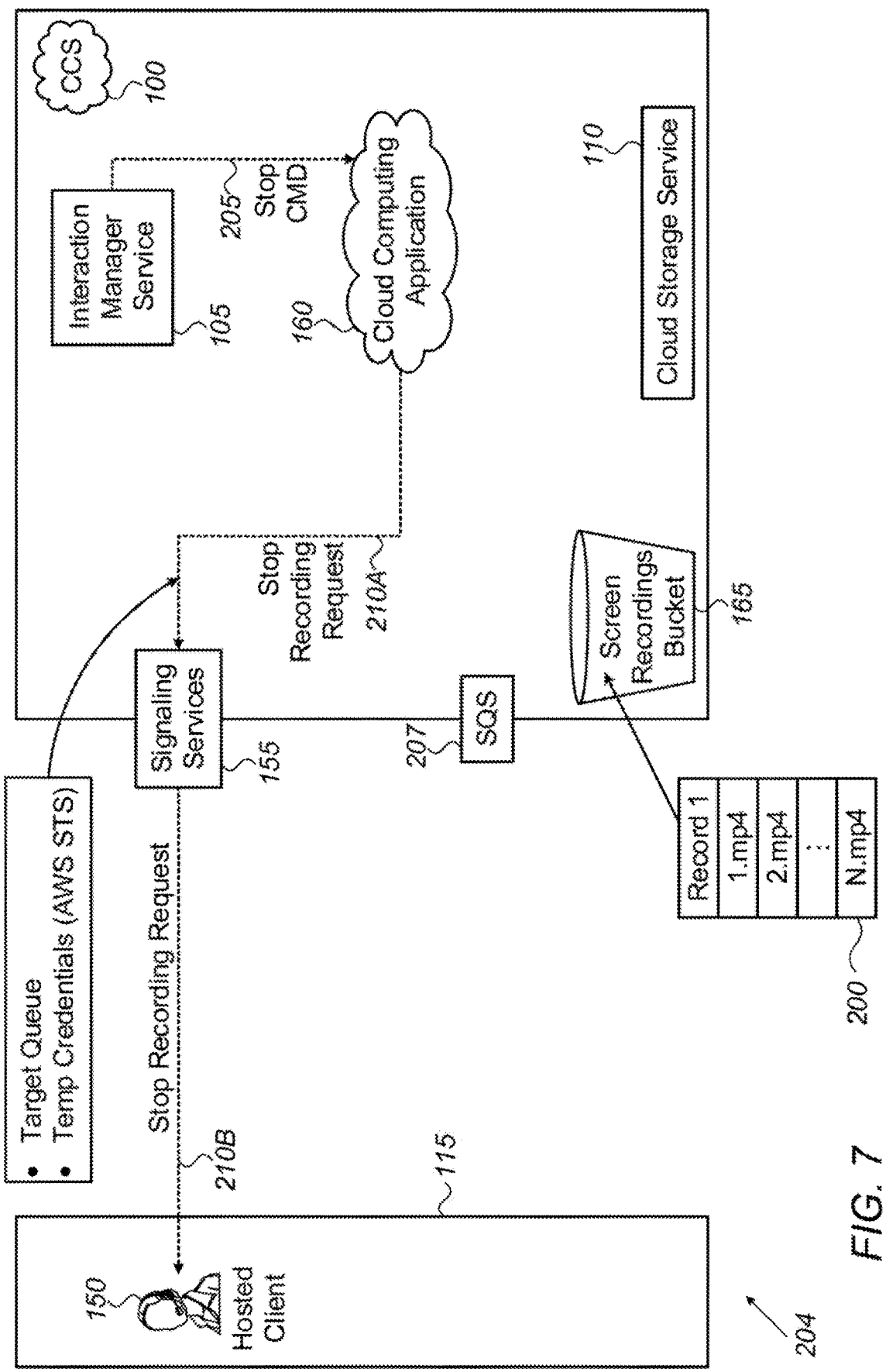
FIG. 7 schematically illustrates a flow diagram for issuing a stop recording request to a hosted client at a client computer, in accordance with some embodiments of the present invention.

FIG. 7 schematically illustrates a flow diagram 204 for issuing a stop recording request 210 to hosted client 150 at client computer 15, in accordance with some embodiments of the present invention. On or before the end of the agent's call, interaction manager service 105 may issue a stop recording command 205 to cloud computing application 160. In response, cloud computing application 160 issues a stop recording request 210A which may be relayed to signaling services 155, which then further relays stop recording request 210B to screen agent 30 of hosted client 150. Stop recording request 210 may include a location (e.g., target queue on server 20) of screen recordings bucket 165 and temporary credentials (AWS STS) to allow PUT messages into the target queue of screen recordings bucket 165. Simple Queue Service (SQS) 207 may monitor the relaying of video fragment files to screen recordings bucket 165. Using these parameters, screen agent 30 may notify SQS 207 about screen event capturing and upload completion.

Figure 8:
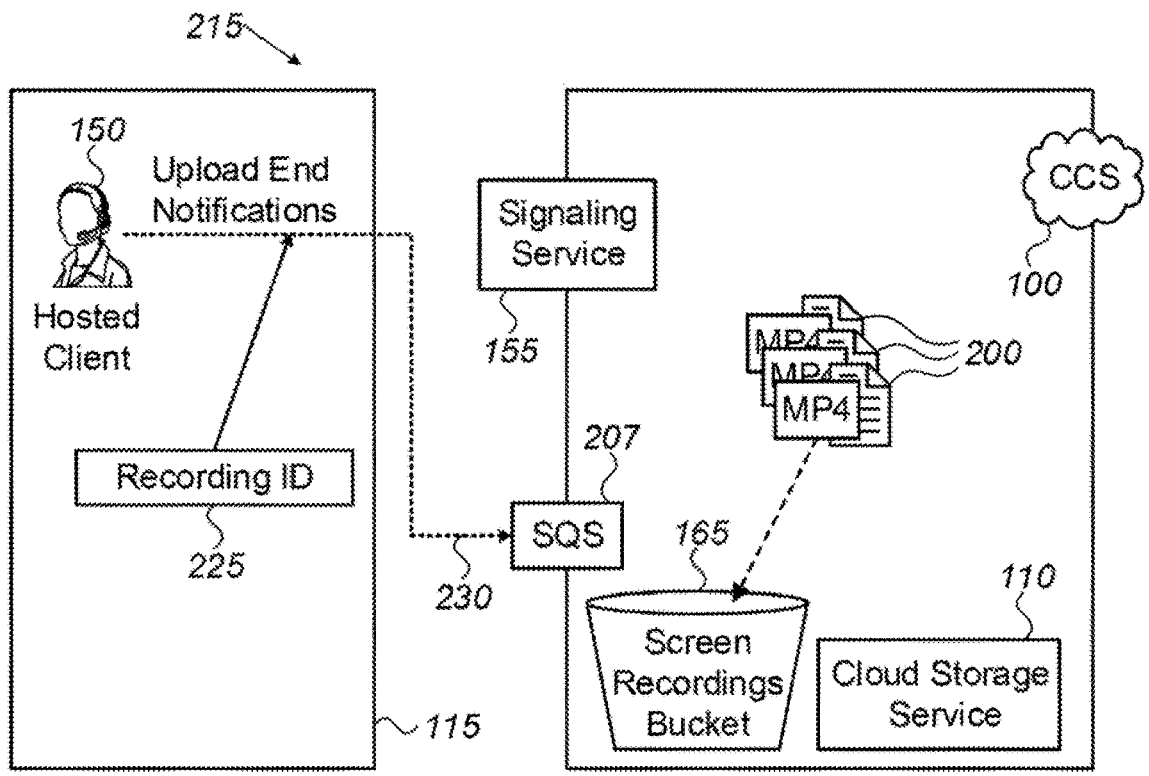
FIG. 8 schematically illustrates a flow diagram for uploading an end notification to a Simple Queue Service (SQS), in accordance with some embodiments of the present invention.

FIG. 8 schematically illustrates a flow diagram 215 for uploading an end notification 230 to SQS 207, in accordance with some embodiments of the present invention. When the last media container (e.g., video fragment file) had been uploaded from the client computer to screen recording bucket 165, a client notification message including a recording ID number 225 notifying SQS 207 that all of the video fragment files have been uploaded to Target Cloud Queue (e.g., screen recording buckets 165).

In some embodiments of the present invention, upload end notification 230 may include a tenant ID, a recording ID, a number of files, and a metadata file.

Figure 9:
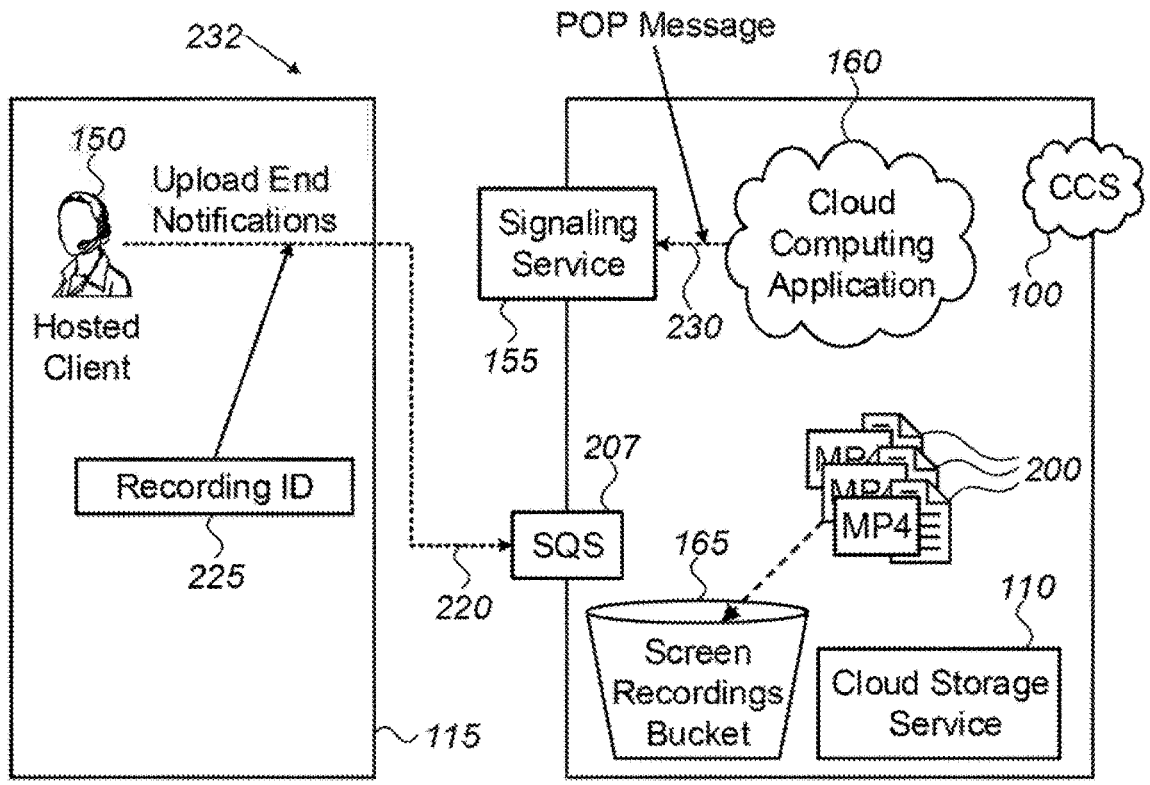
FIG. 9 schematically illustrates a flow diagram for a cloud computing application to issue a POP message to signaling services, in accordance with some embodiments of the present invention.

FIG. 9 schematically illustrates a flow diagram 232 for cloud computing application 160 to start a video recording by issuing a POP message 230 to signaling services 155, in accordance with some embodiments of the present invention. For completion of the recording flow, cloud computing application 160 may execute a Serverless Post Recording Service, and may issue pop message 230 to signaling services 155.

Figure 10:
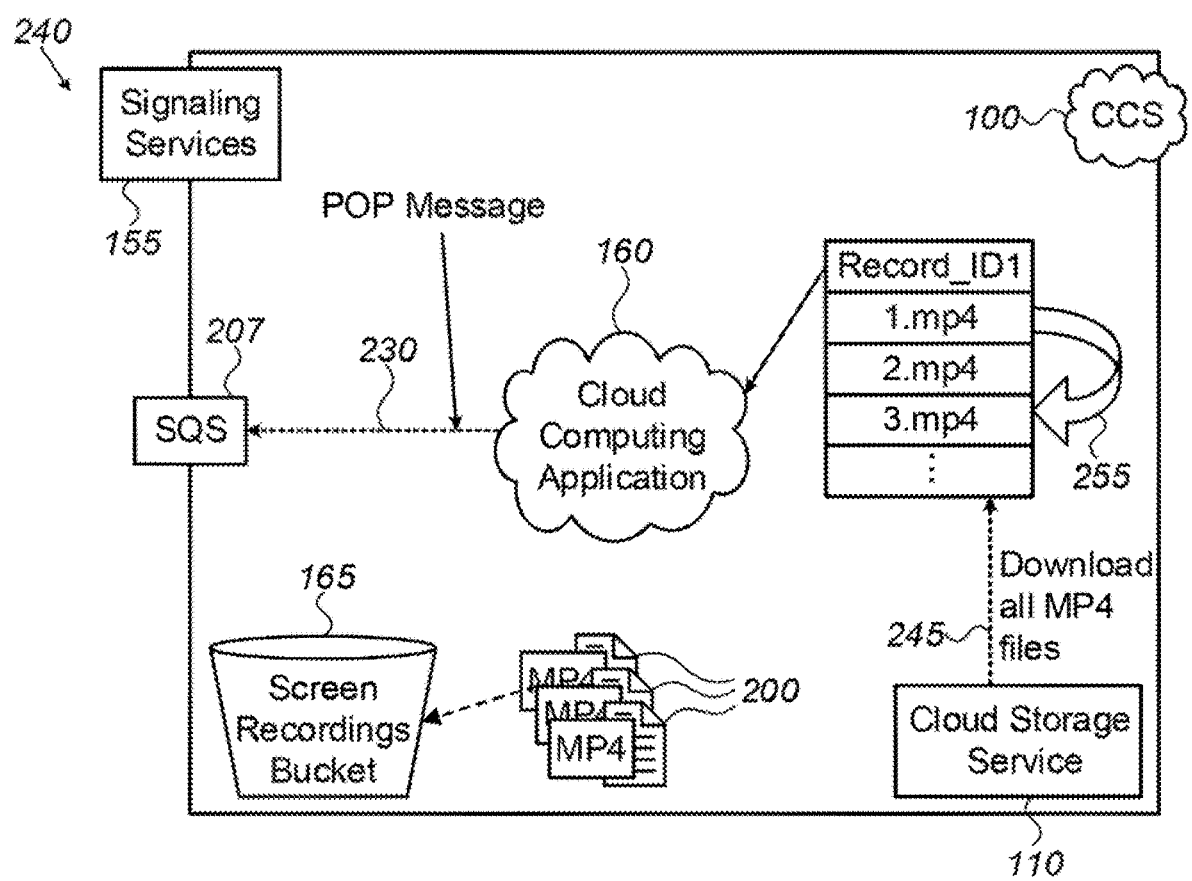
FIG. 10 schematically illustrates a flow diagram for merging video fragment files, in accordance with some embodiments of the present invention.

FIG. 10 schematically illustrates a flow diagram 240 for merging video fragment files 200, in accordance with some embodiments of the present invention. All video recording fragments files 200 may be downloaded from the Target Upload Location (e.g., screen recordings bucket 165 in cloud storage service 110) by cloud computing application 160 (e.g., AWS Lambda) and may be merged as denoted by an arrow 255 into a single standard media file (e.g., single recording file).

Figure 11:
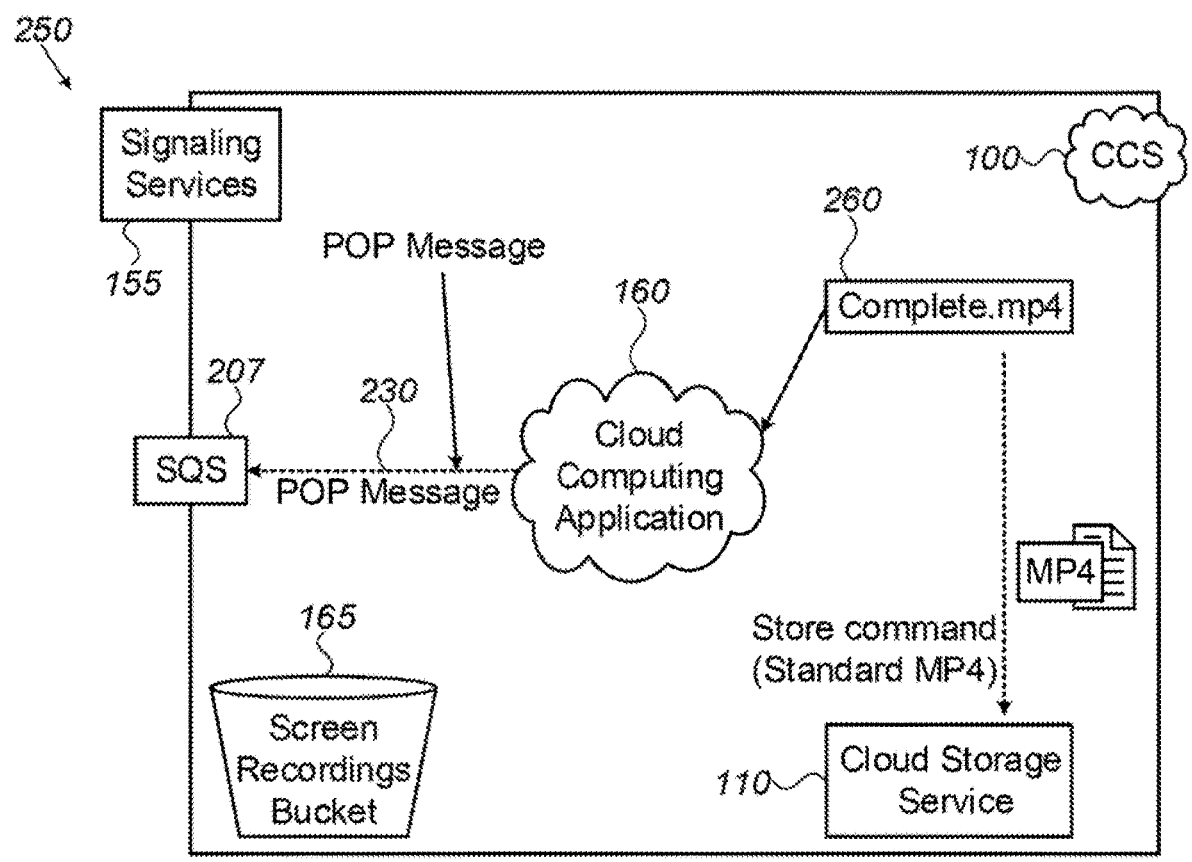
FIG. 11 schematically illustrates a flow diagram for storing a single recording file created by merging video fragment files in a cloud storage service, in accordance with some embodiments of the present invention.

FIG. 11 schematically illustrates a flow diagram 250 for storing a single recording file 260 created by merging video fragment files 200 in cloud storage service 110, in accordance with some embodiments of the present invention. Single recording file 260 denoted Complete.mp4 may be subsequently uploaded to cloud storage service 110 for later playback.

Figure 12:
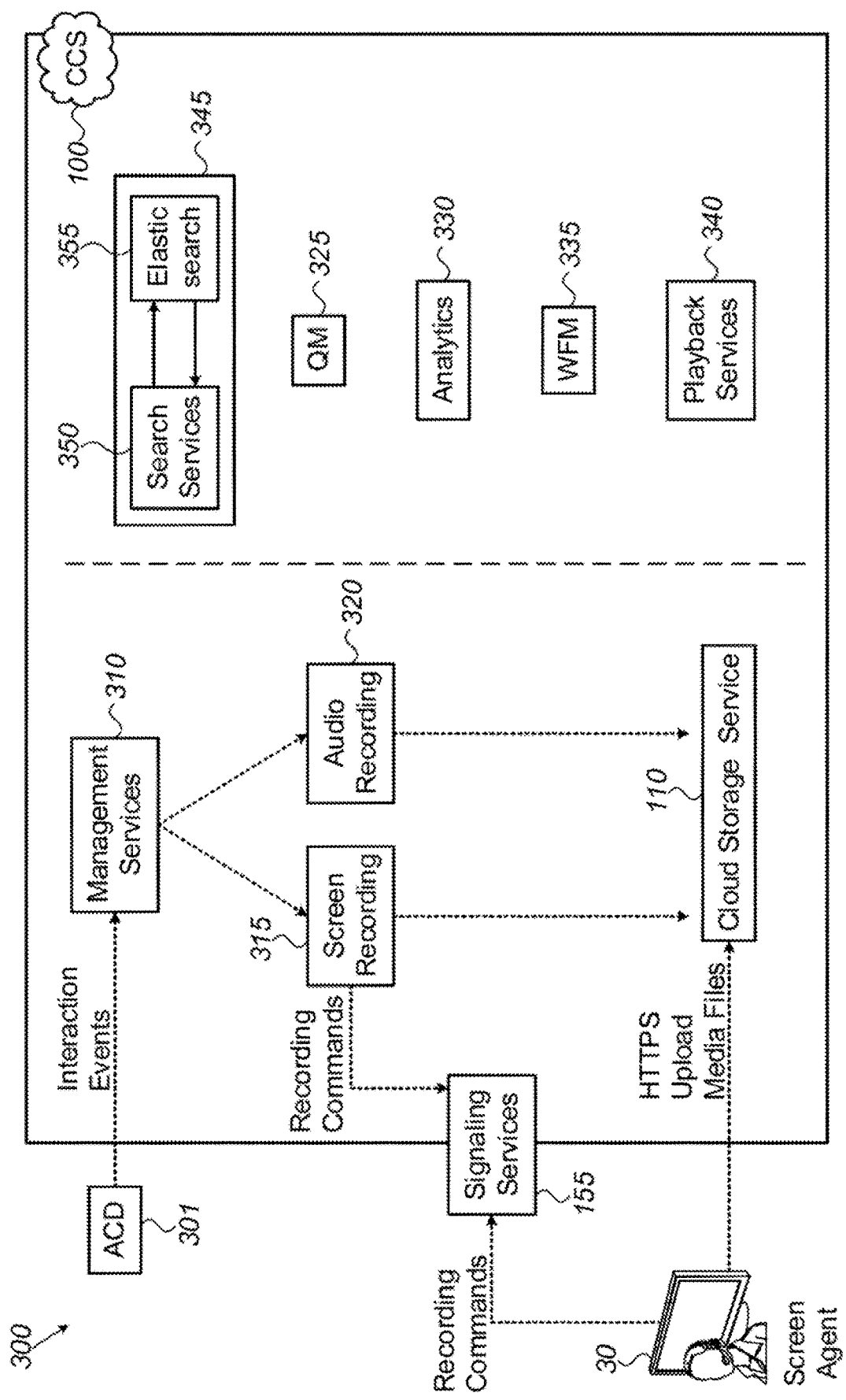
FIG. 12 schematically illustrates an architecture for managing a fragmented recording of events on a screen of a client computer by a server, in accordance with some embodiments of the present invention.

FIG. 12 schematically illustrates an architecture 300 for managing a fragmented recording of events on a screen of a client computer by a server, in accordance with some embodiments of the present invention. Architecture diagram 300 shows how the solution for creating a fragmented video recording of a screen using a cloud-based serverless architecture fits within a product framework. The recording flow may be the initial step for many contact center solution services, based on automatic call distributor (ACD) 301 events, provided by a product framework such as Quality Management (QM) 325, Analytics 330, Work Force Management (WFM) 335, and Playback 340. Management services 310 may operate the recorders (e.g., screen recording 315 and audio recording 320) based on ACD 301 events, and may store the metadata to serve the product framework by using a search 350 and elastic search services 355 as shown in a block 345.

In some embodiments of the present invention, screen agent client 30 may include a smart upload algorithm to dynamically adjust the video fragment settings during the creation of the video fragment files with the captured screen events. The smart algorithm may be configured to ensure a complete and high quality video recording of screen events, a minimal client footprint (e.g., low CPU loading, low memory loading, low disk space usage, and little network throughput loading), no backlogs in the server storage location (e.g., screen recording bucket 165) or client computer queue (e.g., queue 195), a responsive seek (forward and backward) function during playback of complete video recording file 260, and minimal computational and storage costs in using the serverless computing application.

In some embodiments of the present invention, there may be tradeoffs when adjusting the various video fragment settings of GOP size, file duration, and frame rate.

For example, (1) increasing the GOP size may reduce the recorded fragment file size (e.g., larger GOP size results less Iframes) and may reduce network throughput. However, increasing the GOP size may also result in a poor seek performance during playback.

(2) Decreasing the GOP size may enable a better seek performance during playback since a smaller GOP results in more Iframes. However, decreasing the GOP size may also result in a higher network throughput and a backlog in queue 195 of fragment files to be uploaded due to the larger video fragment file sizes.

(3) Decreasing file duration may result in better seek performance during playback since each fragment file starts with an Iframe and more fragment files for lower file duration results in more Iframes. However, decreasing the file duration results in more fragment files to be uploaded. This may result in higher serverless computing service pricing for merging the increased number of files on the server side, a backlog of files to be merged in the server side, and a higher storage price due to a higher number of HTTP upload (PUT) requests. Note that if a backlog occurs due to many video recordings in the server side, this may trigger new cloud computing application 160, such as AWS Lambda to be established increasing the pricing.

(4) Increasing the file duration may decrease network throughput since increasing the file duration may subsequently result in less fragment files and less Iframes. This may also decrease the number of files to be merged on the server side. However, increasing the file duration may result in the need for larger client disk space as well as increasing the risk of losing larger portions of the recording in the event of network or system failure.

(5) Reducing frame rate to reduce file size may result in a decrease in network throughput since there are less fragment files and less Iframes. However reducing the frame rate may result in poor seek performance during playback and reduced video quality.

In some embodiments of the present invention, nominal video fragment settings may be initially used and adjusted dynamically as impairments in the network quality and/or video quality may be detected. The nominal video fragment settings (e.g., default settings) may include:

File Duration—60 seconds (Iframe per file)

Group of Pictures—400 (for reasonably responsive seek function)

Average File Size—2 MB

Average file upload time—6 seconds (e.g., to client side, no backlog)

Process CPU—~20%

Average Merge time—0.5 second per file on server side, no backlog

Video Visual Quality—Checked

In some embodiments of the present invention, a backlog of video fragment files in queue 195 may be defined where the number of video fragment files in queue 195 exceeds a predefined number, such as 2 video fragment files, for example. When a backlog is detected by client processor 25 (e.g., by screen agent 30), different actions may be taken to manage the backlog.

Figure 13:
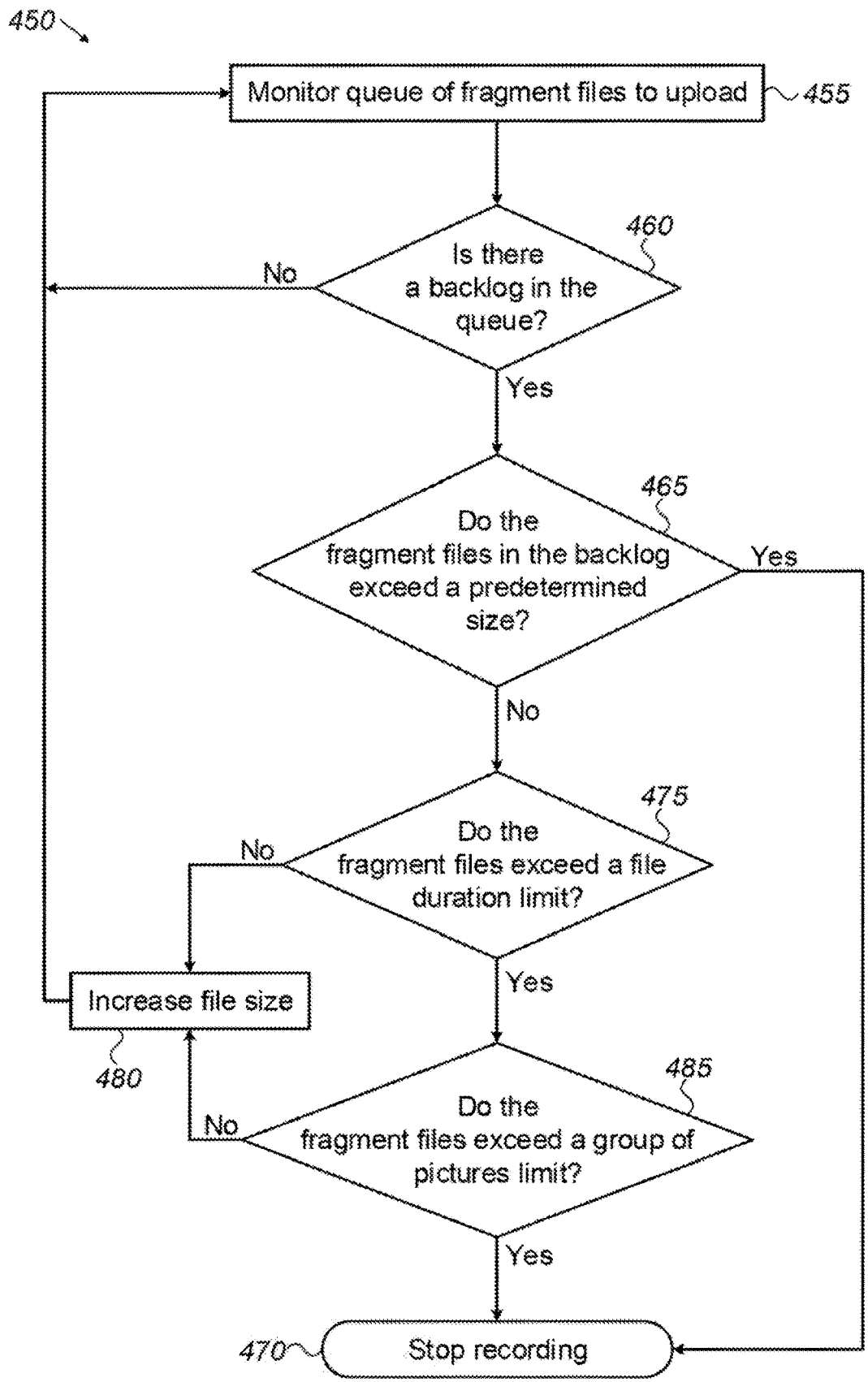
FIG. 13 is a flowchart illustrating a method for managing a backlog of video fragment files in a queue, in accordance with some embodiments of the present invention.

FIG. 13 is a flowchart illustrating a method 450 for managing a backlog of video fragment files in queue 195, in accordance with some embodiments of the present invention. Method 450 may be performed by screen agent 30 executed by client processor 25 on client computer 15.

Method 450 may include monitoring 455 queue 195 of fragment files to be uploaded to screen recording bucket 165.

Method 450 may include a decision step 460 where processor 25 assesses if there is a backlog in queue 195. If not, processor continues to monitor 455 the queue. If there is a backlog, then processor 25 may assess whether the files in the backlog exceeds a predetermined size in a decision step 465. If so, processor 25 stops 470 the recording of the screen events as an error condition exists. In some embodiments, the already-created video fragment files may be deleted.

If not, processor 25 may then continue to assess if the video fragment files exceed a duration limit in a decision step 475. If not, processor 25 may adjust the video fragment settings, so as to increase 480 the file size, and processor 25 continues to monitor 455 the queue.

If the fragment files do exceed a file duration limit, processor 25 then assesses if the fragment files excess a group of pictures limit in a decision step 485. If so, processor 25 may stop 470 the recording. If not, processor 25 may adjust the video fragment settings so as to increase 480 the file size, and processor 25 then continues to monitor 455 the queue.

In some embodiments of the present invention, the video fragment files may be encrypted, relayed over the communication network to the server, and decrypted and merged in cloud computing application 160 (e.g., in AWS Lambda, for example).

Figure 14:
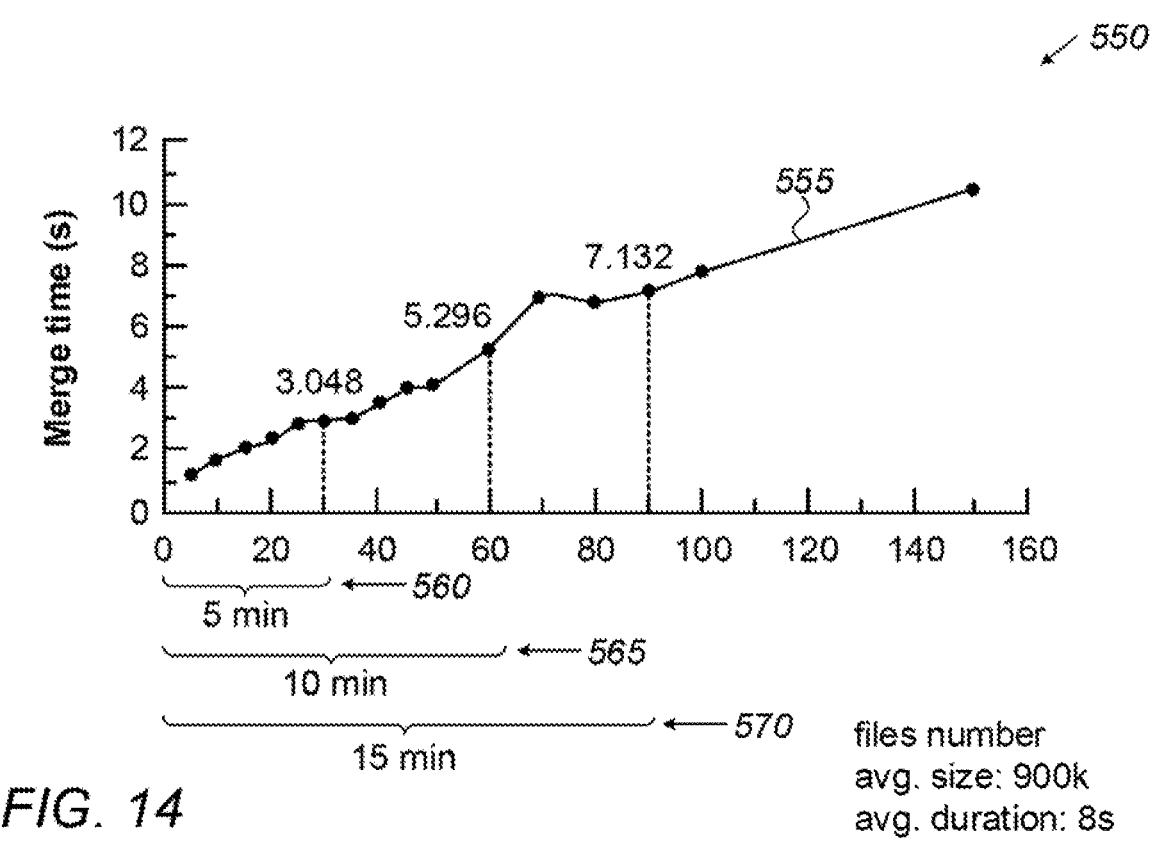
FIG. 14 is a graph of merge time versus a number of video fragment files, in accordance with some embodiments of the present invention.

FIG. 14 is a graph 550 of merge time versus a number of video fragment files, in accordance with some embodiments of the present invention. Graph 550 illustrates that the measured merge time may be substantially linear with the number of files to merge. Graph 550 illustrates on the horizontal axis the number of files to be merged where each file had an average size of 900 KB and an average duration of 8 seconds. Marker 560 illustrates the merge time and the number of recorded video fragment files for a 5 minute call, marker 565 for a 10 minute call, marker 570 for a 15 minute call.

In the Tables below, the CPU usage was found empirically to remain substantially the same at about 30% for all configurations shown in the Tables as follows:

TABLE I

Measured Merge Time of the same number of file (10 files) of different sizes

| AVG. FILE SIZE | AVG. FILE DURATION | MERGE TIME |
| --- | --- | --- |
| 5000 | 45 | 1.82 |
| 1600 | 19 | 1.992 |
| 600 | 7 | 2.002 |
| 300 | 3 | 1.791 |

TABLE II

Measured Merge Time for a different number of files with different sizes for a 5-minute recording

| NUMBER OF FILES | AVG. FILE SIZE | AVG. FILE DURATION | MERGE TIME |
| --- | --- | --- | --- |
| 6 | 5000 | 45 | 1.166 |
| 15 | 1600 | 19 | 2.366 |
| 40 | 800 | 7 | 3.049 |
| 61 | 600 | 5 | 4.733 |
| 95 | 400 | 3 | 6.633 |

TABLE III

Measured Merge Time for a different number of files with different sizes for a 10-minute recording

| NUMBER OF FILES | AVG. FILE SIZE | AVG. FILE DURATION | MERGE TIME |
| --- | --- | --- | --- |
| 12 | 5000 | 45 | 2.186 |
| 30 | 1600 | 19 | 3.223 |
| 80 | 800 | 7 | 6.773 |
| 122 | 600 | 5 | 8.77 |
| 190 | 400 | 3 | 13.007 |

Measurements were taken to determine the optimal GOP, file size, and recording length to determine the optimal upload times as shown in Table IV below:

TABLE IV

Measured Data for Determining Optimal Upload Time

| GOP size | Frame Rate | Segment Length Parameter | File Length (sec) | File Size | Upload Time (sec) | Upload Rate |
|---|---|---|---|---|---|---|
| 400 | 15 | 400/15 = 26 | 26 | 335 KB | 6.5 | 51 KB/sec |
| | | | 43 | 555 KB | 3.4 | 163 KB/sec |
| | | | 26 | 343 KB | 2.6 | 131 KB/sec |
| | | | 25 | 382 KB | 6.8 | 56 KB/sec |
| | | | 18 | 699 KB | 3.2 | 218 KB/sec |
| 400 | 15 | 80 | 82 | 5,280 KB | 7.9 | 668 KB/sec |
| | | | 78 | 1,825 KB | 4.5 | 405 KB/sec |
| | | | 85 | 2,032 KB | 4.3 | 472 KB/sec |
| 405 | 15 | 108 | 109 | 2,622 KB | 7.2 | 364 KB/sec |
| | | | 109 | 1,986 KB | 4.2 | 472 KB/sec |
| | | | 119 | 2,482 KB | 4.7 | 528 KB/sec |
| | | | 104 | 3,557 KB | 4.8 | 741 KB/sec |
| | | | 100 | 1,827 KB | 4.3 | 424 KB/sec |
| | | | 128 | 2,079 KB | 15.8 | 131 KB/sec |
| 378 | 27 | 378/27 = 14 | 18 | 346 KB | 7.1 | 48 KB/sec |
| | | | 10 | 216 KB | 2.4 | 90 KB/sec |
| | | | 18 | 714 KB | 3.2 | 223 KB/sec |
| | | | 14 | 284 KB | 2.5 | 113 KB/sec |
| | | | 8 | 100 KB | 2.1 | 47 KB/sec |
| | | | 21 | 924 KB | 3.4 | 271 KB/sec |
| | | | 12 | 262 KB | 2.5 | 104 KB/sec |
| | | | 10 | 332 KB | 2.9 | 114 KB/sec |
| | | | 20 | 599 KB | 3.1 | 193 KB/sec |
| | | | 6 | 158 KB | 2.4 | 65 KB/sec |
| | | | 14 | 613 KB | 3 | 204 KB/sec |
| 450 | 15 | 120 | 122 | 2,066 KB | 9.4 | 219 KB/sec |
| | | | 145 | 2,110 KB | 5.3 | 398 KB/sec |
| | | | 103 | 1,524 KB | 3.7 | 411 KB/sec |
| | | | 113 | 1,468 KB | 4.1 | 358 KB/sec |
| | | | 131 | 1,849 KB | 4.6 | 400 KB/sec |
| 450 | 15 | 60 | 70 | 2,144 KB | 7 | 306 KB/sec |
| | | | 57 | 1,163 KB | 3.8 | 306 KB/sec |
| | | | 60 | 3,091 KB | 9.7 | 318 KB/sec |
| | | | 81 | 2,582 KB | 4.8 | 537 KB/sec |
| | | | 46 | 1,156 KB | 3.6 | 321 KB/sec |
| | | | 60 | 911 KB | 8 | 113 KB/sec |
| | | | 44 | 1,004 KB | 3.5 | 286 KB/sec |
| | | | 59 | 3,844 KB | 5 | 768 KB/sec |

Figure 15:
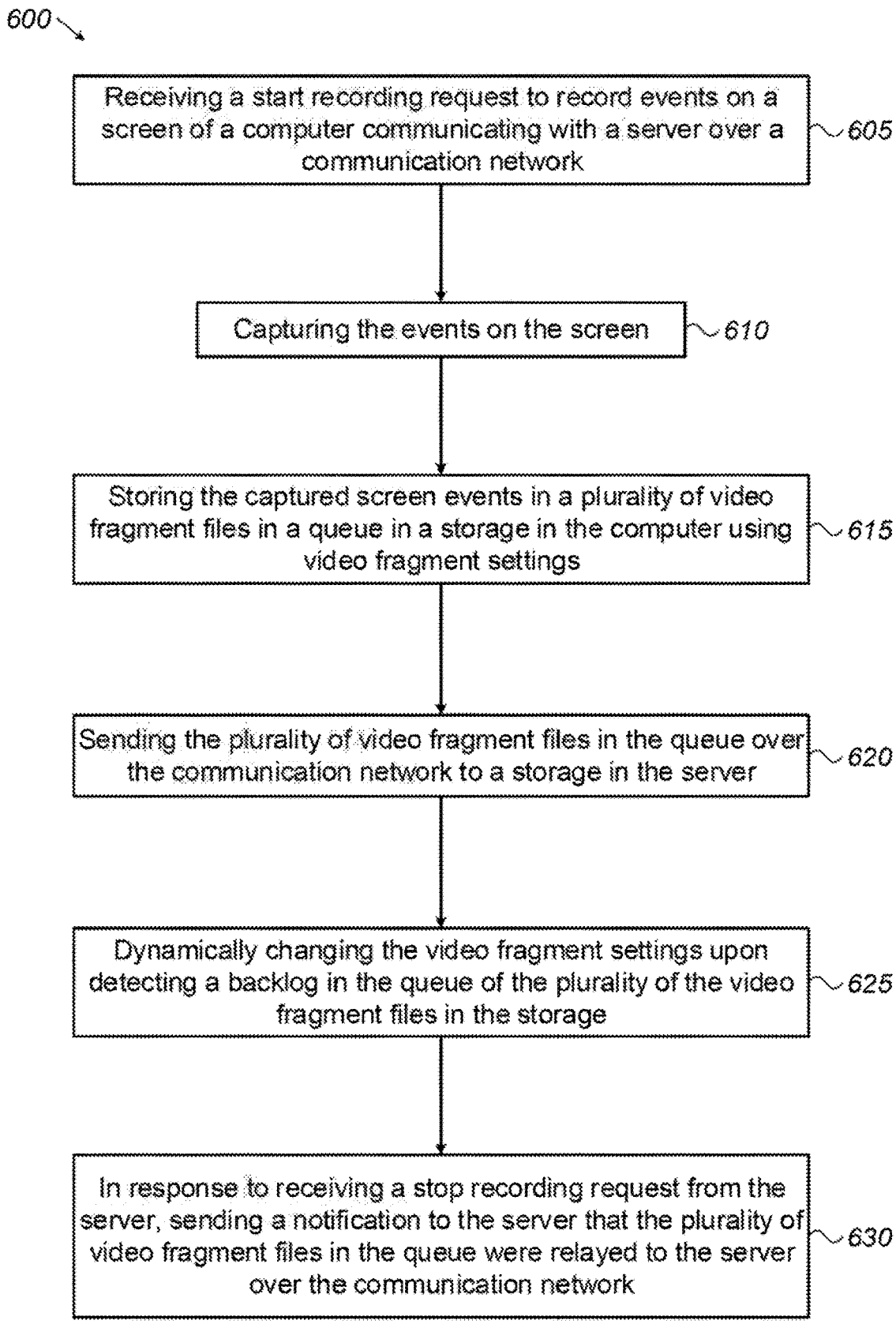
FIG. 15 is a flowchart of a method for creating a fragmented recording of events on a screen of a computer, in accordance with some embodiments of the present invention.

FIG. 15 is a flowchart of a method 600 for creating a fragmented recording of events on a screen of a computer, in accordance with some embodiments of the present invention. Method 600 may be performed by client processor 25 on client computer 15.

Method 600 may include receiving 605 a start recording request to record events on a screen (e.g., output device 35) of a client computer 15 communicating with server 20 over communication network 50.

Method 600 may include capturing 610 the events on the screen.

Method 600 may include storing 615 the captured screen events in a plurality of video fragment files in a queue in storage 47 (e.g., a local disk) in client computer 15 using video fragment settings. The video fragment settings applied while storing 615 the captured screen events into the plurality of video fragment files may include but not limited to the video frame rate, the group of pictures (GOP) size, and/or video fragment file duration, for example.

Method 600 may include sending 620 the plurality of video fragment files in the queue over the communication network to storage 90 in server 20.

Method 600 may include dynamically changing 625 the video fragment settings upon detecting a backlog in the queue of the plurality of the video fragment files in the storage.

Method 600 may include sending 630 a notification to the server that the plurality of video fragment files in the queue were relayed to the server over the communication network in response to receiving a stop recording request from the server.

Figure 16:
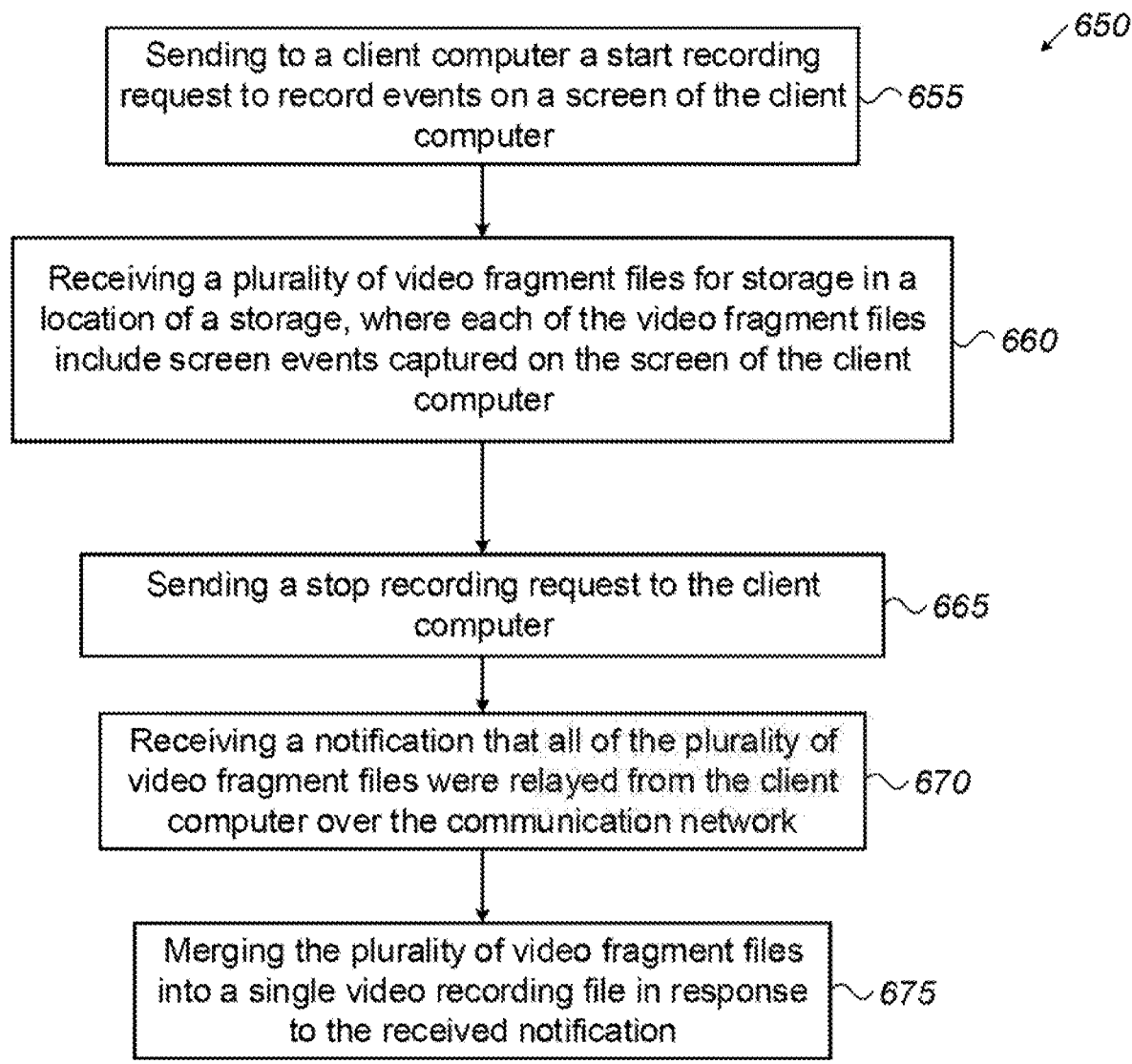
FIG. 16 is a flowchart of a method for managing a fragmented recording of events on a screen of a client computer by a server, in accordance with some embodiments of the present invention.

FIG. 16 is a flowchart of a method 650 for managing a fragmented recording of events on a screen of a client computer by a server, in accordance with some embodiments of the present invention. Method 650 may be performed by server processor 60 on server 20.

Method 650 may include sending 655 to client computer 15 a start recording request to record events on screen 35 of client computer 15.

Method 650 may include receiving 660 a plurality of video fragment files for storage in a location (e.g., screen recording bucket 165) of server storage 90, where each of the video fragment files include screen events captured on screen 35 of client computer 15.

Method 650 may include sending 665 a stop recording request to client computer 15.

Method 650 may include receiving 670 a notification that all of the plurality of video fragment files were relayed from client computer 15 over communication network 50 to server 20.

Method 650 may include merging 675 the plurality of video fragment files into a single video recording file in response to the received notification.

In some embodiments of the present invention, a computerized method for creating a fragmented recording of events on a screen of a computer may include a processor of a computer configured to execute code for recording events on a screen of the computer. A start recording request may be received by the processor to record the screen events from a server communicating with the computer over a communication network. The events on the screen may be captured by the processor. The captured screen events may be stored by the processor into a storage of the computer in a plurality of video fragment files in a queue in the storage by applying video fragment settings. The plurality of video fragment files in the queue may be sent by the processor over the communication network to the server. The video fragment settings may be dynamically changed upon detecting a backlog in the queue of the plurality of video fragment files in the storage. In response to receiving a stop recording request from the server, a notification may be sent by the processor to the server that all of the plurality of video fragment files in the queue were relayed to the server over the communication network for the server to merge the plurality of video fragment files into a single video recording file.

In some embodiments of the present invention, sending the plurality of video fragments may include uploading the plurality of video fragment files to a distributed cloud storage.

In some embodiments of the present invention, detecting the backlog in the queue may include detecting that a number of the plurality of video fragment files exceeds a predefined number.

In some embodiments of the present invention, dynamically changing the video fragment settings may include changing a group of pictures (GOP) size in the plurality of video fragment files for managing the backlog.

In some embodiments of the present invention, dynamically changing the video fragment settings may include changing a frame rate of the plurality of video fragment files for managing the backlog.

In some embodiments of the present invention, dynamically changing the video fragment settings may include changing a frame duration of the plurality of video fragment files for managing the backlog.

In some embodiments of the present invention, the captured screen events may be selected from the group consisting of: audio signals captured by an input device, audio signals captured through an output device, videos captured on the screen, and images captured on the screen.

In some embodiments of the present invention, the communication network may use a Hypertext Transfer Protocol Secure (HTTPS) protocol for sending the plurality of video fragment files to the server.

In some embodiments of the present invention, a client computer for creating a fragmented recording of events on a screen of the computer may include a storage, a screen, and a processor. The processor may be configured to execute code for recording events on the screen, to receive a start recording request to record the screen events from a server communicating with the computer over a communication network, to capturing the events on the screen, to store the captured screen events into a plurality of video fragment files in a queue in the storage by applying video fragment settings, to send the plurality of video fragment files in the queue over the communication network to the server, to dynamically change the video fragment settings upon detecting a backlog in the queue of the plurality of video fragment files in the storage, and in response to receiving a stop recording request from the server, to send a notification to the server that all of the plurality of video fragment files in the queue were relayed to the server over the communication network for the server to merge the plurality of video fragment files into a single video recording file.

In some embodiments of the present invention, the storage may include a local disk on the client computer.

In some embodiments of the present invention, the code for recording the events on the screen may include a screen agent client software.

In some embodiments of the present invention, the plurality of video fragment files may include a plurality of standard containers.

In some embodiments of the present invention, the processor may be configured to detect the backlog in the queue by detecting that a number of the plurality of video fragment files exceeds a predefined number.

In some embodiments of the present invention, the processor may be configured to dynamically change the video fragment settings by changing a group of pictures (GOP) size in the plurality of video fragment files for managing the backlog.

In some embodiments of the present invention, the processor may be configured to dynamically change the video fragment settings by changing a frame rate of the plurality of video fragment files for managing the backlog.

In some embodiments of the present invention, the processor may be configured to dynamically change the video fragment settings by changing a frame duration of the plurality of video fragment files for managing the backlog.

In some embodiments of the present invention, the communication network may use a Hypertext Transfer Protocol Secure (HTTPS) protocol to send the plurality of video fragment files to the server.

In some embodiments of the present invention, a computerized method for managing a fragmented recording of events on a screen of a client computer in a computerized system by a server communicating with a client computer over a communication network, sending by a processor to the client computer a start recording request to record events on a screen of the client computer. A plurality of video fragment files may be received by the processor for storage in a location of a storage in the server, wherein each of the video fragment files include screen events captured on the screen of the client computer. A stop recording request may be sent to the client computer. A notification may be received by the processor that all of the plurality of video fragment files were relayed from the client computer over the communication network. In response to the received notification, the plurality of video fragment files may be merged by the processor into a single video recording file.

In some embodiments of the present invention, the processor may execute a serverless computing service for managing the plurality of video fragment files to create the single video recording file.

In some embodiments of the present invention, systems and methods for providing optimized agent screen recording, e.g., using a cloud parallel recording plugin service, may allow e.g., 100% screen recording for all of an agent's active digital interactions.

Embodiments of the invention divide into at least two domains: the client domain and the cloud domain. In some embodiments, the client domain (e.g., a screen agent application operating on the agent's client computer as described herein) may perform a single shared interaction recording, manage a recording manifest (as described herein) for each recording fragment, and provide a single upload channel to a centralized cloud location. The cloud domain may provide serverless based cloud media forking (e.g., copying or otherwise replicating of a file).

In some embodiments, a screen agent application (also referred to herein as a "screen agent") may maintain an inner mapping for all ongoing interactions. This mapping allows the screen agent to turn on/off the Simple Parallel Recording Plugin, as described herein.

Figure 17:
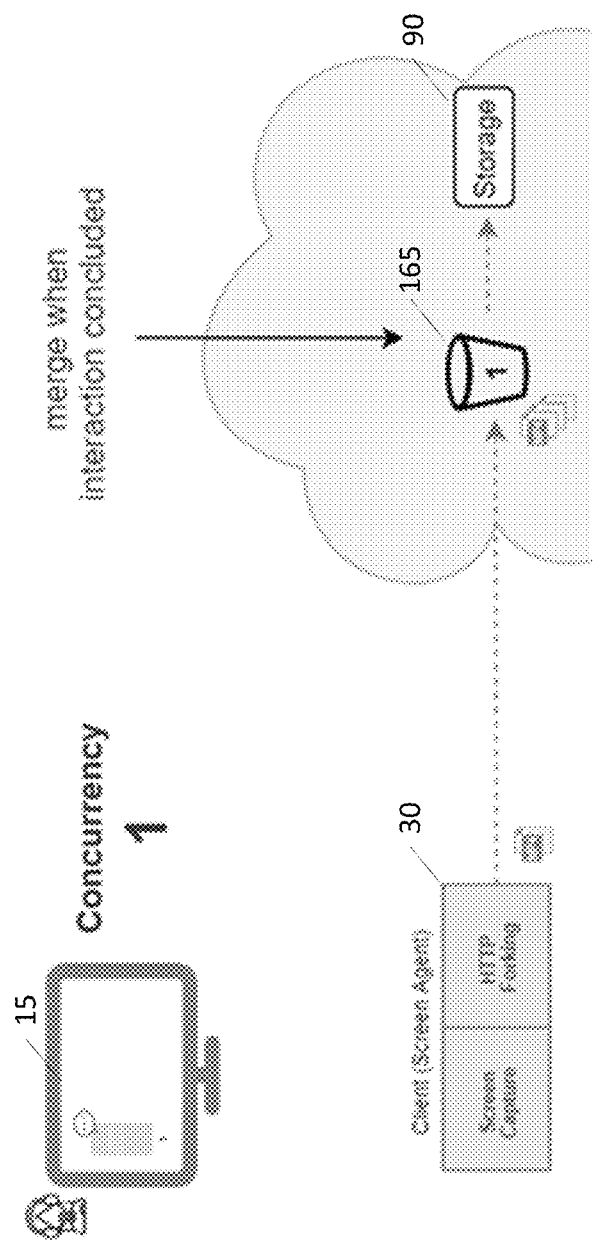
FIG. 17 schematically illustrates a flow diagram for uploading video fragment files when the number of concurrent interactions is equal to one, in accordance with some embodiments of the present invention.

FIG. 17 schematically illustrates a flow diagram for uploading video fragment files 200 when the number of concurrent interactions is equal to one, in accordance with some embodiments of the present invention. In the case where the number of concurrent interactions is equal to one, in some embodiments the plugin may be turned off, deactivated, or otherwise not activated.

In some embodiments, once a recording fragment 200 is recorded, e.g., on screen of a client computer 15, and is ready to upload (e.g., there is a file recording completion event), the screen agent application 30 will create a manifest file if the plugin is turned on, otherwise it will fall back to the Screen Recording process described in FIGS. 1-16. In these embodiments, the video fragment files 200 are stored in an interactions target location (e.g., a target upload location in distributed cloud storage), such as screen recording bucket 165 or the like, and merged when the interaction is concluded, and for example, stored in long term storage such as storage 90.

Figure 18:
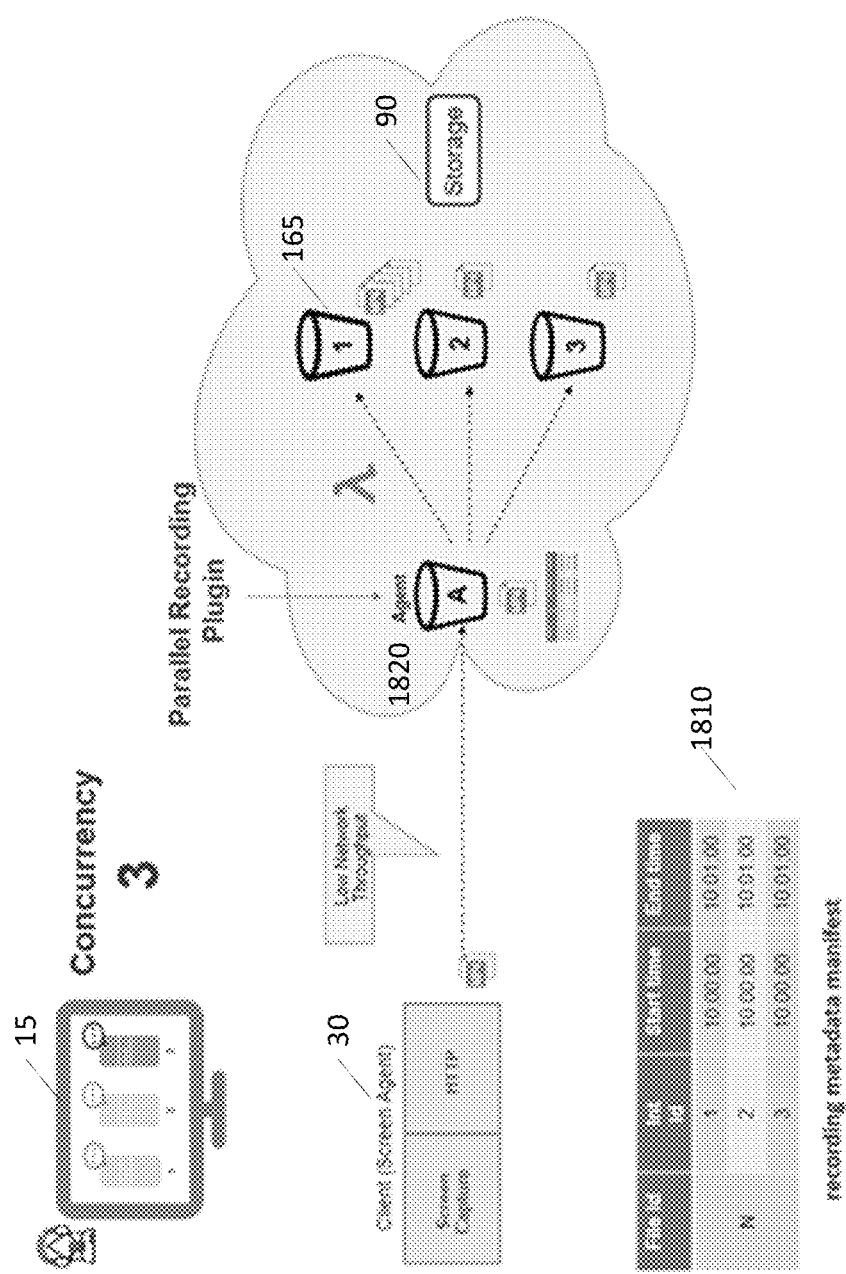
FIG. 18 schematically illustrates a flow diagram for uploading video fragment files when the number of concurrent interactions is equal greater than one, in accordance with some embodiments of the present invention.

FIG. 18 schematically illustrates a flow diagram for uploading video fragment files when the number of concurrent interactions is greater than one, in accordance with some embodiments of the present invention. In some embodiments, the screen agent may maintain an inner mapping for all ongoing interactions. This mapping may allow the screen agent to be able to turn on and off the Parallel Recording Plugin as necessary. In the case where the number of concurrent interactions is greater than one, in some embodiments the parallel recording plugin may be activated, e.g., automatically. In some embodiments, while the parallel recording plugin is activated, the system may perform screen recording of a plurality of digital interactions that are being concurrently handled by the same agent desktop, such as client computer 15, (e.g., in parallel) while having a single recording footprint with respect to the agent's CPU, memory an network throughput and without reducing the recording video quality.

As explained in further detail herein, the parallel recording plugin relies on the use of a recording metadata manifest 1810 which is created by screen agent 30 when a recording file is ready to be uploaded and/or is updated with information relating to each interaction. The metadata manifest 1810 enables merging of the correct video fragment files 200 for each interaction. In some embodiments, the metadata manifest may include at least an interaction identifier, interaction recording start time or video fragment file creation time (the latest of the two), and an interaction recording end time or video fragment file last update time (the earliest of the two). As explained herein, while the parallel recording plugin is activated, in some embodiments once a recording file 200 is ready to be uploaded the processor may be configured to upload the recording file to an Agent target 1820, from which the recording file 200 may be forked to various interaction targets 165, e.g., based on the metadata manifest 1810, as explained herein. For each recording fragment in the cloud storage location associated with the agent a serverless function may use the manifest to distribute the recording fragments and its metadata to all related cloud storage locations associated with the interactions and add the ".last" suffix if needed, as described in detail herein.

Figure 19:
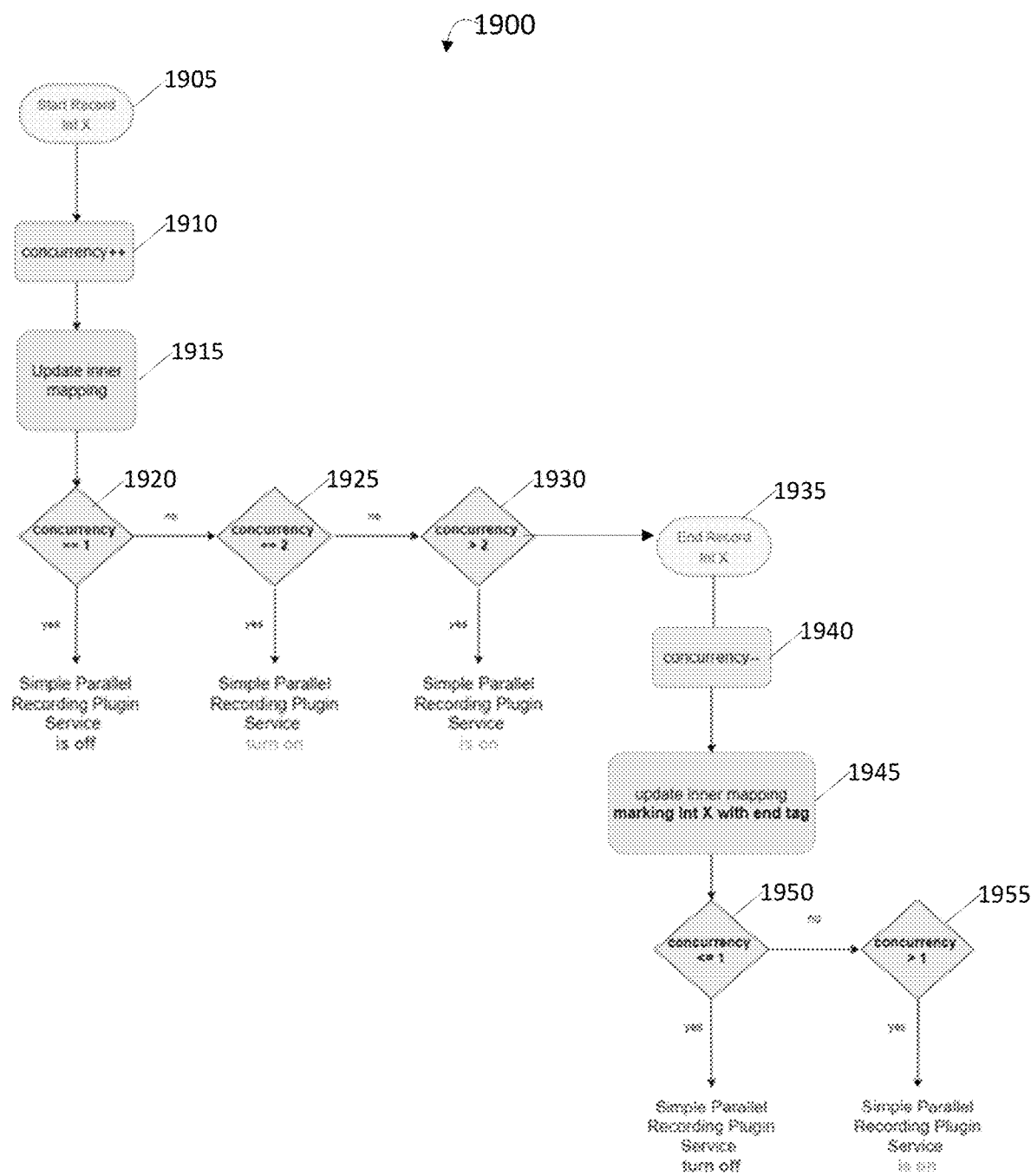
FIG. 19 is a flowchart of a method for parallel recording of events on a screen of a computer, in accordance with some embodiments of the present invention.

FIG. 19 is a flowchart of a method 1900 for activating and deactivating a parallel recording plugin, in accordance with some embodiments of the present invention. The method begins at step 1905, when a start recording request is identified or otherwise received by the screen agent client application 30 (e.g., running on the client computer) to start recording the events on the screen. In some embodiments, each start recording request has an associated interaction identifier (ID) identifying each interaction. At step 1910, in some embodiments, the number of concurrent interactions is updated. As described herein, in some embodiments, whether there are multiple concurrent interactions being recorded in parallel or only one interaction being record may dictate how recording fragment files are managed.

At step 1915, in some embodiments, an inner mapping of the ongoing interactions may be updated (e.g., in an inner mapping database, as shown in Table 5 below) with the interaction data, for example, an interaction identifier, current local time representing the interaction start time, etc.

TABLE 5

| inner mapping database | | |
| --- | --- | --- |
| Interaction ID | start time | end time |
| X | <Start time> | — |

At step 1920, in some embodiments, if the interaction concurrency is equal to one upon updating the number of concurrent interactions, then the Simple Parallel Recording Plugin Service remains off or otherwise deactivated. At steps 1925 and 1930, in some embodiments, if the interaction concurrency is greater than one (e.g., a plurality) upon updating the number of concurrent interactions, then the Simple Parallel Recording Plugin Service is activated (or otherwise remains activated).

At step 1935, in some embodiments, a stop recording request is identified or otherwise received by the screen agent client application (e.g., running on the client computer 15) to stop recording the events on the screen. In some embodiments, a stop request may also be associated with an ID. At step 1940, in some embodiments, the number of concurrent interactions is again updated. At step 1945, in some embodiments, the inner mapping of the ongoing interactions may be updated (e.g., in the inner mapping database) with, e.g., the current local time (or some other identified time or period) representing the interaction end time, as shown in Table 6 below.

TABLE 6

| inner mapping database | | |
| --- | --- | --- |
| Interaction ID | start time | end time |
| X | <Start time> | <End time> |

At step 1950, in some embodiments, if the interaction concurrency is equal to or less than one upon updating number of concurrent interactions, then the Simple Parallel Recording Plugin Service remains off or is otherwise deactivated (e.g., if the prior concurrency was greater than one). Finally, at step 1955, in some embodiments, if the interaction concurrency is still greater than one (e.g., a plurality) upon updating number of concurrent interactions, then the Simple Parallel Recording Plugin Service remains activated.

In some embodiments, once the number of concurrent interactions reverts back to one interaction (e.g., all other interactions are terminated), the parallel recording plugin may be automatically turned off or otherwise deactivated, and the system may revert to its initial Screen Recording behavior, as described herein.

In some embodiments, while the parallel recording plugin is activated, on the cloud domain side, for each recording fragment uploaded to agent target 1820, a serverless function (e.g., a Fork Lambda) may use the metadata manifest to distribute the recording and its metadata to all related interaction targets or folders 165 and, in some embodiments, add, e.g., a ".last" suffix to the last fragment if needed, to trigger a file merge.

While embodiments of the invention provide a method of forking each recording fragment once the fragment is received on the server side, in other embodiments, forking may be performed on the client side, prior to transfer of the fragment. However, forking from the server side avoids higher network throughput. In case of a single interaction, in some embodiments the file may be uploaded directly to the interaction folder without being routed via the plugin folder first. In such a case, the client side may control the upload target.

Figure 20:
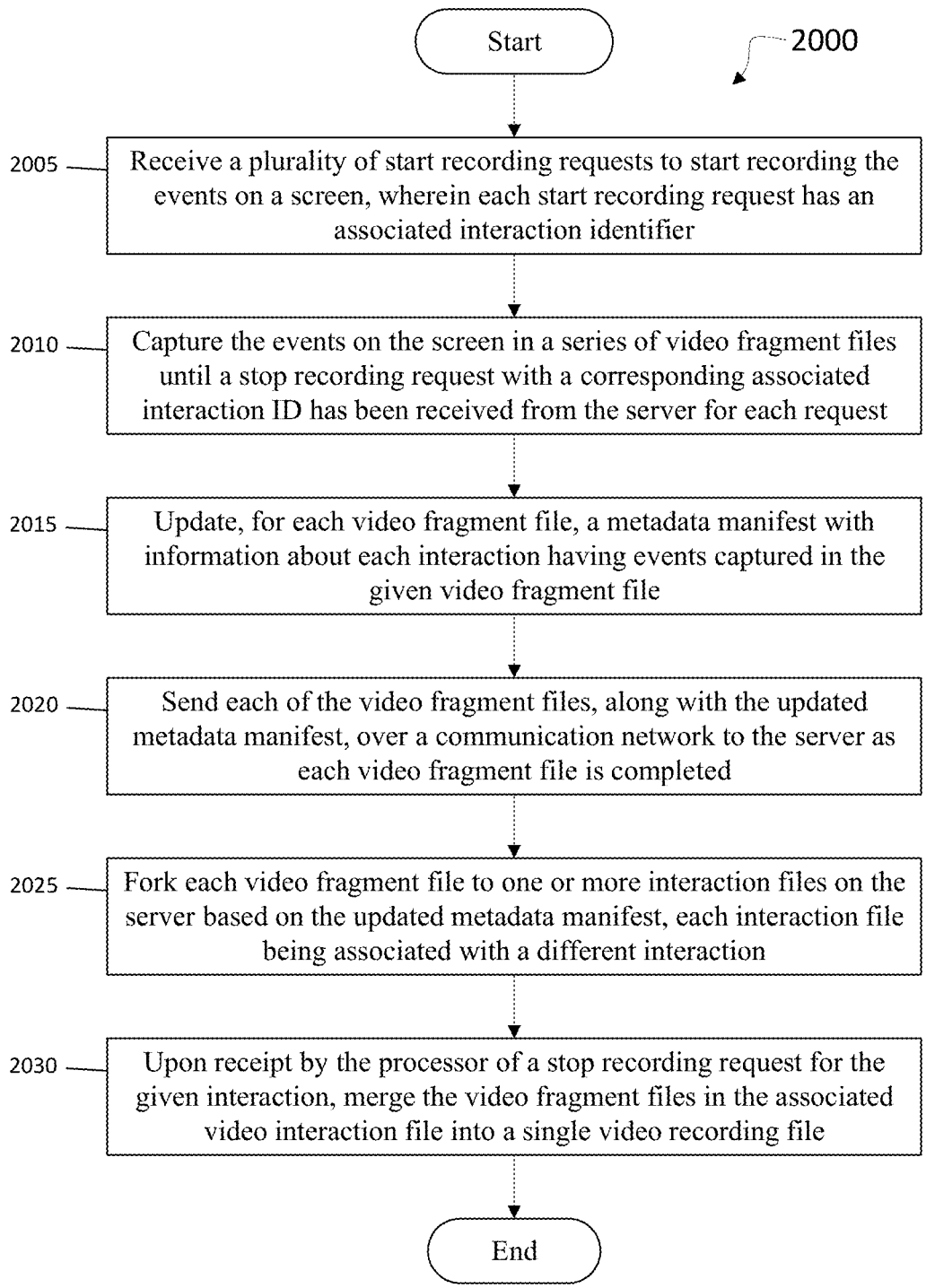
FIG. 20 is a flowchart of a method 2000 for parallel recording of events on a screen of a computer, in accordance with some embodiments of the present invention.

FIG. 20 is a flowchart of a method 2000 for parallel recording of events on a screen of a computer, in accordance with some embodiments of the present invention. The method begins at step 2005 when the processor is configured to receive a plurality of start recording requests to start recording the events on a screen (e.g., of client computer 15), in which each start recording request has an associated interaction identifier.

At step 2010, in some embodiments, the processor may be configured to capture the events on the screen in a series of video fragment files (e.g., recording files 200) until a stop recording request, e.g., with a corresponding associated interaction ID, has been received from the server for each request.

At step 2015, in some embodiments, the processor may be configured to update, for each video fragment file, a metadata manifest (e.g., recording metadata manifest 1810) with information about each interaction having events captured in the given video fragment file.

At step 2020, in some embodiments, the processor may be configured to send each of the video fragment files, along with the updated metadata manifest, over a communication network (e.g., communication network 50) to the server (e.g., server 20) as each video fragment file is completed. In some embodiments, as described herein, each video fragment file, along with the updated metadata manifest, is uploaded to a first target location on the server, e.g., agent target 1820, from which the video fragment files may be distributed.

At step 2025, in some embodiments, the processor may be configured to fork (e.g., copy, duplicate, or otherwise transmit) each video fragment file to one or more interaction files (e.g., interaction target 165) on the server based on the updated metadata manifest, each interaction file being associated with a different interaction. In some embodiments, each recording fragment file may be copied to the Interaction target with the start time and end time data as recorded in the metadata manifest. In some embodiments, when a last recording fragment has been identified and an end tag is marked, the processor may be configured to append or otherwise add a suffix of 'last' (or other defined identifier) to the file name.

At step 2030, in some embodiments, the processor may be configured to, upon receipt by the processor of a stop recording request for the given interaction (e.g., with a file with a .last suffix), merge the video fragment files in the associated video interaction file into a single video recording file. In some embodiments, after processing all the records in the metadata manifest, the recording file may be deleted from the Agent target 1810.

In some embodiments, screen agent 30 may record all concurrent interactions and upon file recording compilation (for example, every minute or other predefined period of time), the file may be uploaded to a new agent folder (e.g., Agent Folder 1820 of FIG. 18). In some embodiments, once the media file is uploaded to an agent folder, a new function (e.g., AWS Lambda) may be triggered which forks (copies) the file to the relevant interaction folders. In some embodiments, the server may support recording file trims, e.g., when an interaction part in the first or last file is smaller than the file duration. For example, in some embodiments, the duration of the media file that is uploaded to the agent folder is may be predefined as 1-minute long (or some other predefined recording segment length/time).

Accordingly, embodiments of the invention are configured to handle two scenarios: (1) The interaction started X seconds after the media file was created; (2) The interaction has ended X seconds before the 1 minute (or other predefined length/time) has passed. In some embodiments, after the media file is copied to the relevant interaction folder, the processor may be configured to trim the parts of the media file that were not part of the interaction. In scenario 1: the processor may cut out the first X seconds from the media file, and only the last (60−X) seconds of the media file will be merged to the complete recording. In scenario 2: the processor may cut out the last X seconds from the media file, and only the first (60−X) seconds of the media file will be merged to the complete recording.

Figure 21:
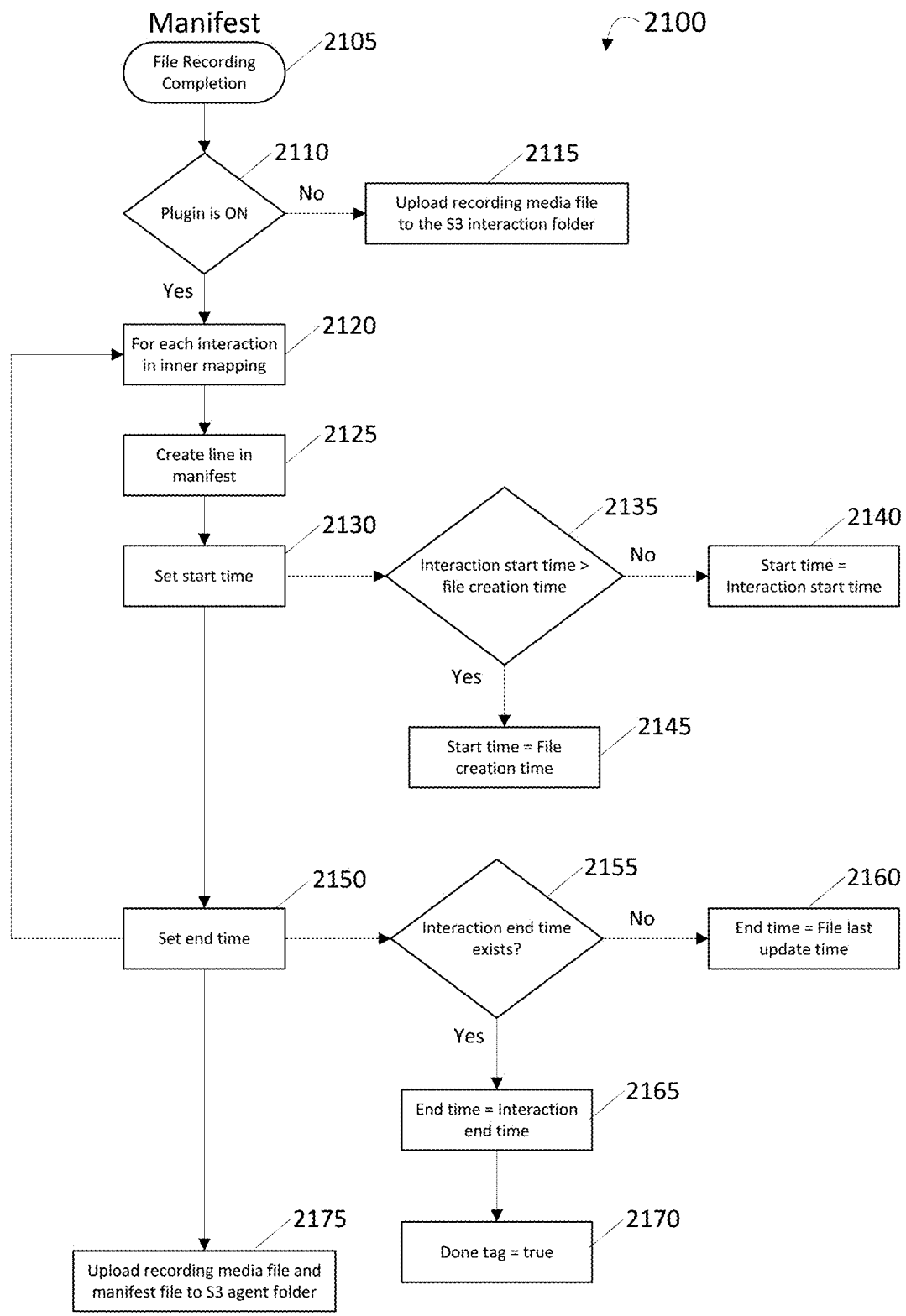
FIG. 21 is a flowchart of a method for creating and updating a metadata manifest, in accordance with some embodiments of the present invention.

FIG. 21 is a flowchart of a method 2100 for creating and updating a metadata manifest, in accordance with some embodiments of the present invention. In some embodiments, the metadata manifest may be derived from the inner mapping that is maintained by the screen agent application. In some embodiments, the metadata manifest may be associated with a recording fragment file in order to provide information about all the interactions of which the fragment is a part.

In some embodiments, the manifest may be provided with at least one or more of the following: (i) Time interval: Providing the time interval enables the processor to compose the final unified screen recording file from all the recording fragments, for each interaction. (ii) End Tag: marking the ended interactions enables triggering the fragment merging mechanism. In some embodiments, the processor may iterate over all interactions listed in the Screen Agent inner mapping. For each interaction, the processor may be configured to create a record in the metadata manifest.

In some embodiments, the metadata manifest record may contain at least one or more of the following: (1) Interaction ID; (2) Start time: the latest between the recording file creation time and the start time of the interaction; (3) End time: the earliest between the recording file last update time and the end time of the interaction.

In some embodiments, at step 2105, a file recoding may be completed. At step 2110, if the plug in is off or otherwise deactivated (e.g., if concurrency is less than or equal to one), then at step 2115 the recording is uploaded to the interaction folder, as described herein. However, if at step 2110 the plug-in is activated (e.g., if the concurrency is greater than one), then in some embodiments, a metadata manifest may be generated, identified, accessed, and/or otherwise provisioned for use as described herein.

In some embodiments, for each interaction (step 2120), a new line may be created in the metadata manifest (step 2125). The line may initially include, for example, an interaction ID and a start time. At step 2130 the start time may be set based on the start of the interaction. If the interaction start time does not precede the file creation time (step 2135), then the start time is set to the interaction start time (step 2140). However, if the Interaction start time does precede the file creation time then the start time may be set to equal the file creation time (step 2145). In some embodiments them process may be executed for multiple interactions.

In some embodiments, once a recording has completed, at step 2150 the end time may be set. If an interaction end time does not exist (step 2155), then at step 2160 the end time may be set to equal the file last update time. If, however, an interaction end time does exist, then at step 2165 the end time may be set to equal the interaction end time and at step 2170 a "done" or "end" tag may be set to equal true, e.g., to indicate that the interaction has completed. Finally, at step 2175, in some embodiments, the recording media file and the metadata manifest file may be uploaded to the agent folder, as described herein.

Figure 22:
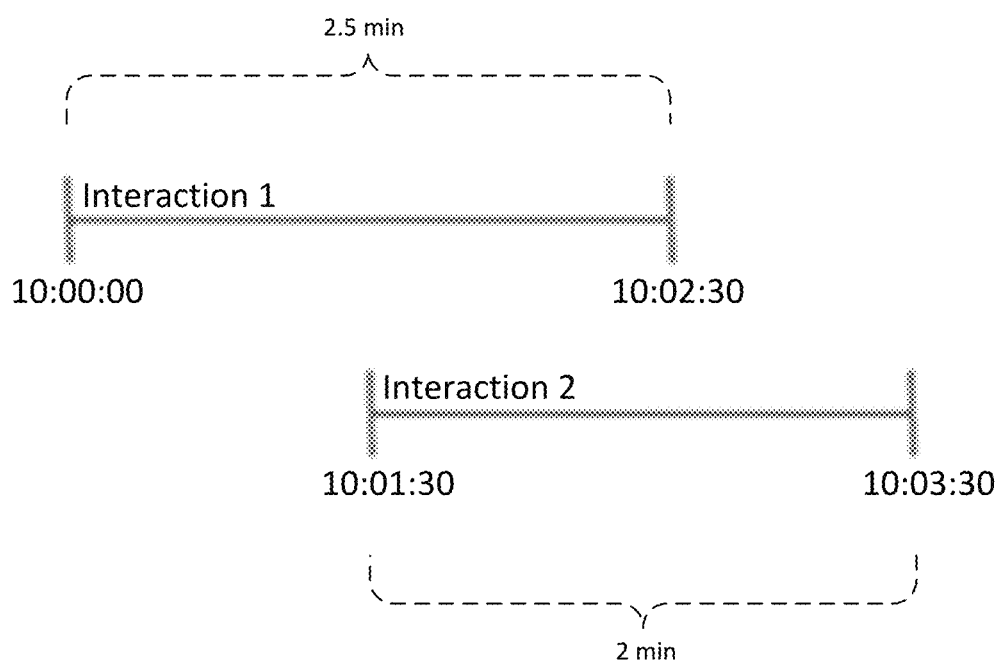
FIG. 22 shows an example recording of two different interactions in accordance with some embodiments of the present invention.

FIG. 22 shows an example recording of two different interactions, in accordance with some embodiments of the present invention. The recordings are concurrent but have different interaction start and end times: A corresponding manifest example for the recording file with ID "F" that is part of two different interactions is shown in Table 7 below.

TABLE 7

Example Metadata Manifest

| File ID | | Start time | End time | end tag |
|---|---|---|---|---|
| F | 1 | 10:02:00 | 10:02:30 | ✓ |
|  | 2 | 10:02:30 | 10:03:00 | — |

In this case: Interaction 1 start time: 10:00:00; Interaction 1 end time: 10:02:30; Interaction 2 start time: 10:02:30; Interaction 2 end time: --; File creation time: 10:02:00; and File last update time: 10:03:00. For the two parallel interactions: "Interaction 1" starts at 10:00:00 and has a 2.5 minutes duration. "Interaction 2" starts at 10:01:30 (during an ongoing recording) and has a 2 minutes duration.

Figure 23:
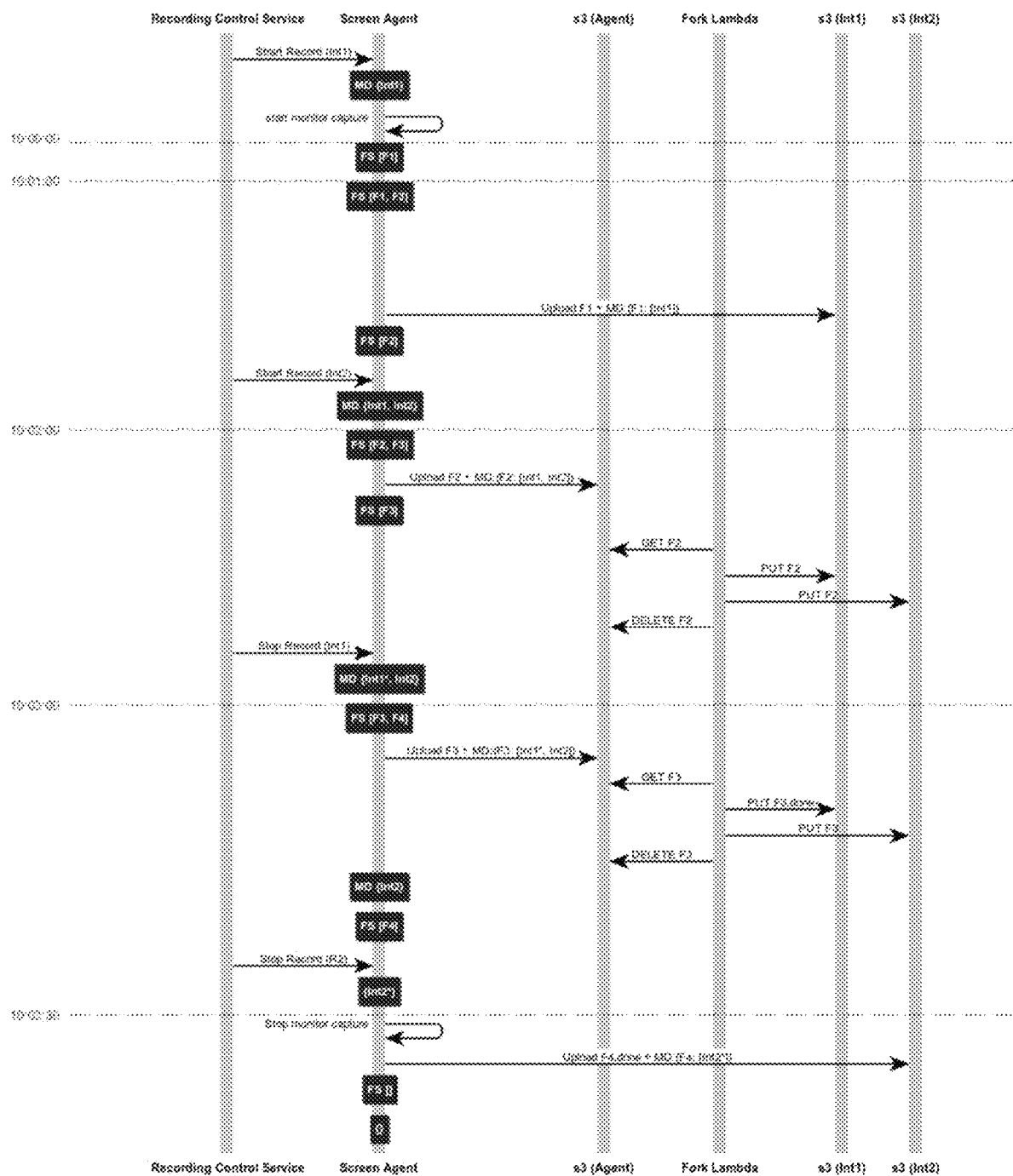
FIG. 23 shows a detailed timeline of the example interaction of FIG. 22, in accordance with some embodiments of the present invention.

FIG. 23 shows a detailed timeline of the example interaction of FIG. 22. In this example, the following shorthand is used:
F—Represents a 1-minute mp4 recording file
Int—Represents a digital channel interaction
MD—Interaction metadata/smart manifest
FS—File system
Agent target—location within the distributed cloud storage service, associated with the agent
Interaction target—location within the distributed cloud storage service, associated with the interaction FIG. 24. FIG. 24B, and FIG. 24C provide a detailed explanation of the recording timeline of FIG. 23 in accordance with some embodiments of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for parallel recording of events on a screen of a computer, performed in a processor of the computer configured to execute code for recording the events on the screen of the computer, the method comprising:
receiving by the processor, from a server communicating with the computer over a communication network, a plurality of start recording requests to start recording the events on the screen, wherein each start recording request has an associated interaction identifier identifying an interaction of a plurality of interactions;
capturing by the processor, the events on the screen in a series of one or more video fragment files until a stop recording request with a corresponding associated interaction identifier has been received from the server for each of the plurality of start recording requests;
updating by the processor, for each video fragment file, a metadata manifest with information about each interaction having events captured in the given video fragment file; and
sending by the processor, each of the one or more video fragment files, along with the updated metadata manifest, over the communication network to the server as each video fragment file is completed;
wherein each video fragment file is forked to one or more interaction files on the server based on the updated metadata manifest, each interaction file being associated with a different interaction; and
wherein, upon receipt by the processor of a stop recording request for the given interaction, the video fragment files in the associated video interaction file are merged into a single video recording file.

2. The method as in claim 1, comprising: storing each merged video recording file in a storage on the server.

3. The method as in claim 1, wherein each of the one or more video fragment files comprises a predetermined length of video.

4. The method as in claim 1, wherein the information in a given updated metadata manifest comprises an interaction identifier, an start time and an end time for each interaction having events captured in the given video fragment file with which the given updated metadata manifest was sent.

5. The method as in claim 1, wherein the series of one or more video fragment files are captured consecutively.

6. The method as in claim 1, wherein one or more of the plurality of start recording requests to start recording the events on the screen are received at least one of synchronously and asynchronously.

7. The method as in claim 1, wherein one or more of the plurality of stop recording requests to stop recording the events on the screen are received at least one of synchronously and asynchronously.

8. A system for parallel recording of events on a screen of a computer, comprising:
a computer having a processor and memory, and
one or more code sets stored in the memory and executed by the processor, which configure the processor to:
receive from a server communicating with the computer over a communication network, a plurality of start recording requests to start recording the events on the screen, wherein each start recording request has an associated interaction identifier identifying an interaction of a plurality of interactions;
capture the events on the screen in a series of one or more video fragment files until a stop recording request with a corresponding associated interaction identifier has been received from the server for each of the plurality of start recording requests;
update for each video fragment file, a metadata manifest with information about each interaction having events captured in the given video fragment file; and
send each of the one or more video fragment files, along with the updated metadata manifest, over the communication network to the server as each video fragment file is completed;

wherein each video fragment file is forked to one or more interaction files on the server based on the updated metadata manifest, each interaction file being associated with a different interaction; and wherein, upon receipt by the processor of a stop recording request for the given interaction, the video fragment files in the associated video interaction file are merged into a single video recording file.

9. The system as in claim 8, wherein the processor is configured to store each merged video recording file in a storage on the server.

10. The system as in claim 8, wherein each of the one or more video fragment files comprises a predetermined length of video.

11. The system as in claim 8, wherein the information in a given updated metadata manifest comprises an interaction identifier, an start time and an end time for each interaction having events captured in the given video fragment file with which the given updated metadata manifest was sent.

12. The system as in claim 8, wherein the series of one or more video fragment files are captured consecutively.

13. The system as in claim 8, wherein one or more of the plurality of start recording requests to start recording the events on the screen are received at least one of synchronously and asynchronously.

14. The system as in claim 8, wherein one or more of the plurality of stop recording requests to stop recording the events on the screen are received at least one of synchronously and asynchronously.

15. A method for parallel recording of events on a screen of a computer, performed on a server in communication over a communication network with a processor of the computer, the processor configured to execute code for recording the events on the screen of the computer, the method comprising:

sending from the server to the processor over the communication network, a plurality of start recording requests to start recording the events on the screen, wherein each start recording request has an associated interaction identifier identifying an interaction of a plurality of interactions;

wherein the processor is configured to capture the events on the screen in a series of one or more video fragment files until a stop recording request with a corresponding associated interaction identifier has been received from the server for each of the plurality of start recording requests; and wherein the processor is configured to update, for each video fragment file, a metadata manifest with information about each interaction having events captured in the given video fragment file;

receiving, by the server, each of the one or more video fragment files, along with the updated metadata manifest, over the communication network from the processor as each video fragment file is completed;

forking, by the server, each video fragment file to one or more interaction files on the server based on the updated metadata manifest, each interaction file being associated with a different interaction; and upon receipt by the processor of a stop recording request for the given interaction, merging by the server the video fragment files in the associated video interaction file into a single video recording file.

16. The method as in claim 15, comprising: storing each merged video recording file in a storage on the server.

17. The method as in claim 15, wherein each of the one or more video fragment files comprises a predetermined length of video.

18. The method as in claim 15, wherein the information in a given updated metadata manifest comprises an interaction identifier, an start time and an end time for each interaction having events captured in the given video fragment file with which the given updated metadata manifest was sent.

19. The method as in claim 15, wherein the series of one or more video fragment files are captured consecutively.

20. The method as in claim 15, wherein one or more of the plurality of start recording requests to start recording the events on the screen are sent at least one of synchronously and asynchronously; and wherein one or more of the plurality of stop recording requests to stop recording the events on the screen are received at least one of synchronously and asynchronously.

* * * * *